(12) United States Patent
Wang et al.

(10) Patent No.: US 12,368,622 B2
(45) Date of Patent: Jul. 22, 2025

(54) UPLINK REFERENCE SIGNAL REPETITION FOR NON-TERRESTRIAL NETWORKS

(71) Applicant: QUALCOMM Incorporated, San Diego, CA (US)

(72) Inventors: Xiao Feng Wang, San Diego, CA (US); Iyab Issam Sakhnini, San Diego, CA (US); Peter Gaal, San Diego, CA (US); Huilin Xu, Temecula, CA (US); Jun Ma, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 17/493,532

(22) Filed: Oct. 4, 2021

(65) Prior Publication Data
US 2022/0116254 A1  Apr. 14, 2022

Related U.S. Application Data

(60) Provisional application No. 63/089,056, filed on Oct. 8, 2020.

(51) Int. Cl.
*H04L 27/26* (2006.01)
*H04L 5/00* (2006.01)
*H04W 84/06* (2009.01)

(52) U.S. Cl.
CPC ........ *H04L 27/2613* (2013.01); *H04L 5/0007* (2013.01); *H04L 5/0051* (2013.01); *H04L 27/2605* (2013.01); H04W 84/06 (2013.01)

(58) Field of Classification Search
CPC ............... H04L 27/2613; H04L 5/0007; H04L 27/2605
See application file for complete search history.

(56) References Cited

U.S. PATENT DOCUMENTS

2011/0116386 A1* 5/2011 Blanchard .............. H04B 7/155
370/242
2011/0280220 A1* 11/2011 Jia ......................... H04W 56/00
370/335

(Continued)

FOREIGN PATENT DOCUMENTS

WO   WO-2020163597 A1   8/2020

OTHER PUBLICATIONS

3GPP TR 38.821 V16.0.0 (Dec. 2019), Technical Report, 3rd Generation Partnership Project; Technical Specification Group Radio Access Network; Solutions for NR to support non-terrestrial networks (NTN) (Release 16) (Year: 2019).*

(Continued)

*Primary Examiner* — Joseph A Bednash
(74) *Attorney, Agent, or Firm* — Holland & Hart LLP

(57) ABSTRACT

This disclosure relates to methods, devices, and systems for wireless communications, and more particularly uplink reference signal repetition for non-terrestrial networks. A user terminal in a non-terrestrial network may identify an uplink reference signal format that includes a comb-based pattern of subcarriers within a first orthogonal frequency-division multiplexing (OFDM) symbol and within a second OFDM symbol for transmission of an uplink reference signal. The user terminal may map the uplink reference signal to a first set of subcarriers within the first OFDM symbol and to a second set of subcarriers within the second OFDM symbol in accordance with the comb-based pattern. Thereby, the user terminal may transmit, to a base station in the non-terrestrial network, the uplink reference signal on the mapped subcarriers of the OFDM symbols, which may be transmitted coherently.

28 Claims, 17 Drawing Sheets

(56) References Cited

U.S. PATENT DOCUMENTS

2016/0197712 A1* 7/2016 Sorrentino ............ H04W 76/28
                                                      370/336
2019/0174466 A1* 6/2019 Zhang .................. H04L 5/0057
2020/0259683 A1* 8/2020 Manolakos ........... H04W 88/06

OTHER PUBLICATIONS

Ericsson, On adapting random access procedures for NTN, 3GPP TSG-RAN WG1 Meeting #97, Reno, USA, May 13-17, 2019, R1-1907393 (Year: 2019).*

International Search Report and Written Opinion—PCT/US2021/071727—ISA/EPO—Jan. 24, 2022.

Qualcomm Incorporated: "Additional SRS Symbols", 3GPP Draft, 3GPP TSG-RAN WG1 #98, R1-1908840, SRS Additional Symbols, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019 (Aug. 17, 2019), pp. 1-10, XP051765448, Retrieved from the Internet: URL: http://www.3gpp.org/ftp/tsg_ran/WG1_RL1/TSGR1_98/Docs/R1-1908840.zip. [retrieved on Aug. 17, 2019] p. 4, paragraph 4 figure 2.

* cited by examiner

UPLINK REFERENCE SIGNAL REPETITION FOR NON-TERRESTRIAL NETWORKS

CROSS REFERENCE

The present application for patent claims the benefit of U.S. Provisional Patent Application No. 63/089,056 by WANG et al., entitled "UPLINK REFERENCE SIGNAL REPETITION FOR NON-TERRESTRIAL NETWORKS," filed Oct. 8, 2020, assigned to the assignee hereof, and expressly incorporated by reference herein.

TECHNICAL FIELD

The following relates generally to wireless communications, and more specifically to uplink reference signal repetition for non-terrestrial networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless multiple-access communications system may include a number of base stations or network access nodes, each simultaneously supporting communication for multiple communication devices, which may be otherwise known as a user terminal or a user equipment (UE). Some wireless communications systems may support non-terrestrial networks, which may provide broad coverage areas by using high-altitude vehicles (e.g., satellites or other non-terrestrial-based high-altitude equipment) between base stations (e.g., next-generation NodeBs or giga-NodeBs (either of which may be referred to as a gNB)) and user terminals or by having base stations on board of the high-altitude vehicles (e.g., satellites). In relay satellite deployment, base stations may transmit data to a satellite which may then be relayed to a user terminal. Although use of high-altitude vehicles may provide benefits, such as larger coverage areas to wireless communications systems, due to the relative high speeds of some high-altitude vehicles (e.g., satellites) with certain orbits, communications between user terminals and the high-altitude vehicles may be challenging.

SUMMARY

The described techniques relate to improved methods, systems, devices, and apparatuses that support techniques related to wireless communications, and more particularly uplink reference signal repetition for non-terrestrial networks. Generally, the described techniques support estimating and correcting time and frequency offsets in non-terrestrial networks between high-altitude vehicles and user terminals. In some examples, the described techniques may include identifying an uplink reference signal format for transmission of an uplink reference signal. The uplink reference signal format may include a comb-based pattern of subcarriers within multiple orthogonal frequency-division multiplexing (OFDM) symbols to support resource sharing among multiple users. The described techniques may include mapping an uplink reference signal to a number of subcarriers within a number of OFDM symbols in accordance with the comb-based pattern, as well as transmitting a number reference signal on the mapped subcarriers. In an example, the OFDM symbols may be transmitted coherently.

The described techniques may also include, in some examples, identifying a comb-based pattern offset that may include a frequency offset between subcarriers of different OFDM symbols. Additionally or alternatively, the described techniques may include identifying a temporal gap configuration between OFDM symbols, or identifying a comb configuration (e.g., a comb 2 (comb2) or a comb 4 (comb4)). The described techniques may therefore include features for improved non-terrestrial communications, higher data rates, increased spectral efficiency, higher mobility support for user terminals and, in some examples, may promote low latency for non-terrestrial communications, among other benefits.

A method of wireless communication at a user terminal in a non-terrestrial network is described. The method may include identifying an uplink reference signal format for transmission of an uplink reference signal based on an indication received from the non-terrestrial network, where the uplink reference signal format includes a comb-based pattern of subcarriers within a first OFDM symbol and within a second OFDM symbol for transmission of the uplink reference signal, mapping the uplink reference signal to a first set of subcarriers within the first OFDM symbol and to a second set of subcarriers within the second OFDM symbol in accordance with the comb-based pattern, and transmitting the uplink reference signal on the first set of subcarriers within the first OFDM symbol and on the second set of subcarriers within the second OFDM symbol, where the first OFDM symbol and the second OFDM symbol are transmitted coherently.

An apparatus for wireless communication in a non-terrestrial network is described. The apparatus may include at least one processor, memory coupled (e.g., operatively, communicatively, functionally, electronically, electrically) to the at least one processor, and instructions stored in the memory. The instructions may be executable by the at least one processor to cause the apparatus to identify an uplink reference signal format for transmission of an uplink reference signal based on an indication received from the non-terrestrial network, where the uplink reference signal format includes a comb-based pattern of subcarriers within a first OFDM symbol and within a second OFDM symbol for transmission of the uplink reference signal, map the uplink reference signal to a first set of subcarriers within the first OFDM symbol and to a second set of subcarriers within the second OFDM symbol in accordance with the comb-based pattern, and transmit the uplink reference signal on the first set of subcarriers within the first OFDM symbol and on the second set of subcarriers within the second OFDM symbol, where the first OFDM symbol and the second OFDM symbol are transmitted coherently.

Another apparatus for wireless communication in a non-terrestrial network is described. The apparatus may include means for identifying an uplink reference signal format for transmission of an uplink reference signal based on an indication received from the non-terrestrial network, where the uplink reference signal format includes a comb-based pattern of subcarriers within a first OFDM symbol and within a second OFDM symbol for transmission of the uplink reference signal, means for mapping the uplink reference signal to a first set of subcarriers within the first OFDM symbol and to a second set of subcarriers within the second OFDM symbol in accordance with the comb-based pattern, and means for transmitting the uplink reference signal on the first set of subcarriers within the first OFDM symbol and on the second set of subcarriers within the second OFDM symbol, where the first OFDM symbol and the second OFDM symbol are transmitted coherently.

A non-transitory computer-readable medium storing code for wireless communication at a user terminal in a non-terrestrial network is described. The code may include instructions executable by at least one processor to identify an uplink reference signal format for transmission of an uplink reference signal based on an indication received from the non-terrestrial network, where the uplink reference signal format includes a comb-based pattern of subcarriers within a first OFDM symbol and within a second OFDM symbol for transmission of the uplink reference signal, map the uplink reference signal to a first set of subcarriers within the first OFDM symbol and to a second set of subcarriers within the second OFDM symbol in accordance with the comb-based pattern, and transmit the uplink reference signal on the first set of subcarriers within the first OFDM symbol and on the second set of subcarriers within the second OFDM symbol, where the first OFDM symbol and the second OFDM symbol are transmitted coherently.

In some examples of the method, apparatuses, and non-transitory computer-readable medium described herein, identifying the uplink reference signal format may include operations, features, means, or instructions for identifying a comb-based pattern offset and a comb offset for one or more of the first OFDM symbol and the second OFDM symbol. In some examples of the method, apparatuses, and non-transitory computer-readable medium described herein, the comb-based pattern offset includes an indication of subcarriers associated with one or more of the first OFDM symbol and the second OFDM symbol. In some examples of the method, apparatuses, and non-transitory computer-readable medium described herein, the comb offset may indicate a first subcarrier of the subcarriers for one or more of the first OFDM symbol and the second OFDM symbol.

In some examples of the method, apparatuses, and non-transitory computer-readable medium described herein, the first OFDM symbol and the second OFDM symbol may have different comb offsets.

Some examples of the method, apparatuses, and non-transitory computer-readable medium described herein may further include operations, features, means, or instructions for identifying the comb offset of the first OFDM symbol, and applying the comb offset to one or more of the first OFDM symbol and the second OFDM symbol based on a pre-defined comb offset sequence pattern, where mapping the uplink reference signal to the first set of subcarriers within the first OFDM symbol and to the second set of subcarriers within the second OFDM symbol may be further based on applying the comb offset sequentially to one or more of the first OFDM symbol and the second OFDM symbol.

In some examples of the method, apparatuses, and non-transitory computer-readable medium described herein, identifying the uplink reference signal format may include operations, features, means, or instructions for identifying a comb configuration for the uplink reference signal, and determining the comb-based pattern based on the comb level configuration.

In some examples of the method, apparatuses, and non-transitory computer-readable medium described herein, the comb configuration includes a comb2 or a comb4.

In some examples of the method, apparatuses, and non-transitory computer-readable medium described herein, identifying the uplink reference signal format may include operations, features, means, or instructions for identifying a temporal gap configuration between the first OFDM symbol and the second OFDM symbol. In some examples of the method, apparatuses, and non-transitory computer-readable medium described herein, the temporal gap configuration may be based on one or more of an accuracy level or a reference signal pulling range.

Some examples of the method, apparatuses, and non-transitory computer-readable medium described herein may further include operations, features, means, or instructions for correcting one or more of a timing offset and a frequency offset based on feedback from the non-terrestrial network.

In some examples of the method, apparatuses, and non-transitory computer-readable medium described herein, the uplink reference signal includes a sounding reference signal.

Some examples of the method, apparatuses, and non-transitory computer-readable medium described herein may further include operations, features, means, or instructions for mapping the uplink reference signal to a third set of subcarriers within a third OFDM symbol in accordance with the comb-based pattern, and where transmitting the uplink reference signal on the first set of subcarriers within the first OFDM symbol and on the second set of subcarriers within the second OFDM symbol further includes transmitting the uplink reference signal on the third plurality of subcarriers within the third OFDM symbol. In some examples of the method, apparatuses, and non-transitory computer-readable medium described herein, the first OFDM symbol, the second OFDM symbol, and the third OFDM symbol are transmitted coherently.

In some examples of the method, apparatuses, and non-transitory computer-readable medium described herein, the first OFDM symbol and the second OFDM symbol may be consecutive.

In some examples of the method, apparatuses, and non-transitory computer-readable medium described herein, the first OFDM symbol and the second OFDM symbol may be non-consecutive.

A method of wireless communication at an access station is described. The method may include determining an uplink reference signal format for an uplink reference signal to be transmitted from a user terminal in a non-terrestrial network, the uplink reference signal format including a comb-based pattern of subcarriers within a first OFDM symbol and within a second OFDM symbol, where the access station and the user terminal are in communication with each other via the non-terrestrial network and receiving, from the user terminal, the uplink reference signal on the first set of subcarriers within the first OFDM symbol and on the second set of subcarriers within the second OFDM symbol, where the first OFDM symbol and the second OFDM symbol are transmitted coherently.

An apparatus for wireless communication is described. The apparatus may include at least one processor, memory coupled (e.g., operatively, communicatively, functionally, electronically, electrically) to the at least one processor, and instructions stored in the memory. The instructions may be executable by the at least one processor to cause the apparatus to determine an uplink reference signal format for an uplink reference signal to be transmitted from a user terminal in a non-terrestrial network, the uplink reference signal format including a comb-based pattern of subcarriers within a first OFDM symbol and within a second OFDM symbol, where the apparatus and the user terminal are in communication with each other via the non-terrestrial network and receive, from the user terminal, the uplink reference signal on the first set of subcarriers within the first OFDM symbol and on the second set of subcarriers within the second OFDM symbol, where the first OFDM symbol and the second OFDM symbol are transmitted coherently.

Another apparatus for wireless communication is described. The apparatus may include means for determining an uplink reference signal format for an uplink reference signal to be transmitted from a user terminal in a non-terrestrial network, the uplink reference signal format including a comb-based pattern of subcarriers within a first OFDM symbol and within a second OFDM symbol, where the apparatus and the user terminal are in communication with each other via the non-terrestrial network and means for receiving, from the user terminal, the uplink reference signal on the first set of subcarriers within the first OFDM symbol and on the second set of subcarriers within the second OFDM symbol, where the first OFDM symbol and the second OFDM symbol are transmitted coherently.

A non-transitory computer-readable medium storing code for wireless communication at an access station is described. The code may include instructions executable by at least one processor to determine an uplink reference signal format for an uplink reference signal to be transmitted from a user terminal in a non-terrestrial network, the uplink reference signal format including a comb-based pattern of subcarriers within a first OFDM symbol and within a second OFDM symbol, where the access station and the user terminal are in communication with each other via the non-terrestrial network and receive, from the user terminal, the uplink reference signal on the first set of subcarriers within the first OFDM symbol and on the second set of subcarriers within the second OFDM symbol, where the first OFDM symbol and the second OFDM symbol are transmitted coherently.

Some examples of the method, apparatuses, and non-transitory computer-readable medium described herein may further include operations, features, means, or instructions for performing one or more of a timing estimation or a frequency estimation based on receiving the uplink reference signal on the first set of subcarriers within the first OFDM symbol and on the second set of subcarriers within the second OFDM symbol.

In some examples of the method, apparatuses, and non-transitory computer-readable medium described herein, determining the uplink reference signal format may include operations, features, means, or instructions for determining a temporal gap configuration between the first OFDM symbol and the second OFDM symbol. In some examples of the method, apparatuses, and non-transitory computer-readable medium described herein, the temporal gap configuration may be based on one or more of an accuracy level or a reference signal pulling range.

In some examples of the method, apparatuses, and non-transitory computer-readable medium described herein, the uplink reference signal includes a sounding reference signal.

In some examples of the method, apparatuses, and non-transitory computer-readable medium described herein, receiving, from the user terminal, the uplink reference signal on the first set of subcarriers within the first OFDM symbol and on the second set of subcarriers within the second OFDM symbol further may include operations, features, means, or instructions for receiving the uplink reference signal on a third set of subcarriers within a third OFDM symbol. In some examples of the method, apparatuses, and non-transitory computer-readable medium described herein, the first OFDM symbol, the second OFDM symbol, and the third OFDM symbol may be transmitted coherently.

In some examples of the method, apparatuses, and non-transitory computer-readable medium described herein, the first OFDM symbol and the second OFDM symbol may be consecutive.

In some examples of the method, apparatuses, and non-transitory computer-readable medium described herein, the first OFDM symbol and the second OFDM symbol may be non-consecutive.

DETAILED DESCRIPTION

Figure 1:
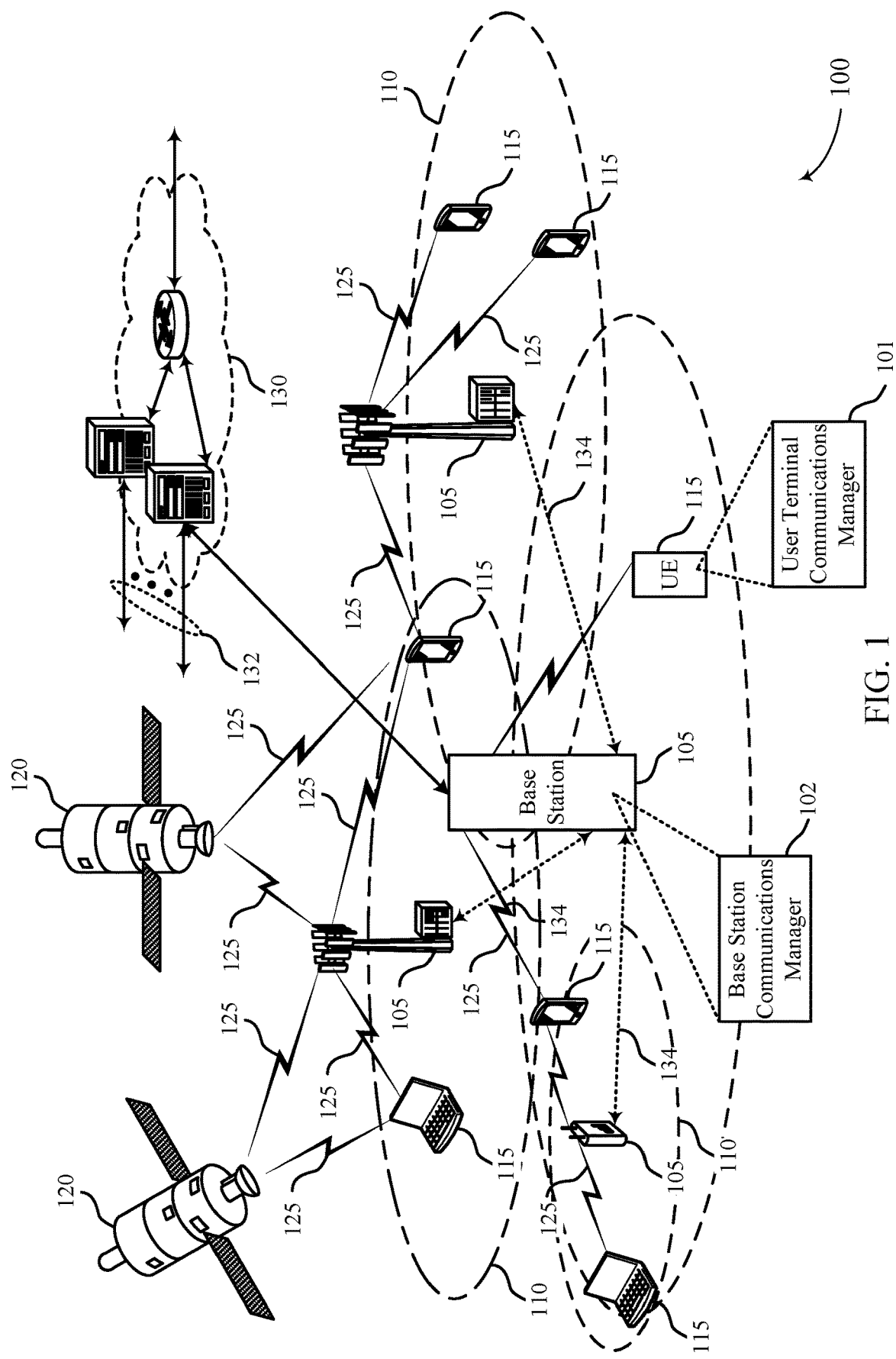
FIGS. 1 and 2 illustrate examples of wireless communications systems that support uplink reference signal repetition for non-terrestrial networks in accordance with one or more aspects of the present disclosure.

Non-terrestrial networks (sometimes referred to as NTNs) may provide coverage by using high-altitude vehicles between user terminals and base stations (e.g., next-generation NodeBs or giga-NodeBs (either of which may be referred to as a gNB)) (also referred to as access stations or access gateways)). Base stations may, for example, transmit data to a satellite which may then be relayed to a user terminal or vice-versa. A high-altitude vehicle itself may be a base station, in some examples. A user terminal may be any device capable of transmitting signals to a satellite. Examples of a user terminal may include a user equipment (UE), a relay equipment configured to relay a signal between a satellite and a user terminal, or a combination thereof. The base station and the satellite may be thousands of kilometers apart and it may take some time for electromagnetic waves to propagate over the distance between the base station and the satellite and between the satellite and the user terminal. The propagation delay for non-terrestrial networks may be many orders of magnitude larger than the propagation delay for terrestrial networks. As such, the round trip delay (sometimes referred to as an RTD) associated with a signal may also be orders of magnitude larger for non-terrestrial networks than for terrestrial networks. Due to the high mobility of high-altitude vehicles such as non-geostationary satellites, communications with the non-geostationary satellites may promote large and time-varying round trip delay and Doppler offset. These variations in round trip delay and Doppler offset may affect user terminals to experience variation in uplink timing and frequency synchronization with satellites. As demand for communication efficiency increases, it may be desirable for wireless communications systems to support a means for estimating and correcting time and frequency errors, particularly due to variation in uplink timing and frequency.

As described herein, user terminals, base stations, and satellites may support estimating and correcting time and frequency errors by supporting an improved uplink reference signal design. A user terminal may identify an uplink reference signal format that includes a comb-based pattern of multiple subcarriers within a number of orthogonal frequency-division multiplexing (OFDM) symbols. The user terminal may map an uplink reference signal to a number of subcarriers within a number of OFDM symbols in accordance with the comb-based pattern. Accordingly, the user terminal may transmit the uplink reference signal on the mapped subcarriers within the OFDM symbols. Here, the OFDM symbols may be transmitted coherently (e.g., the relative phase differences between OFDM symbols at a transmitter output may be known and fixed). By transmitting the uplink reference signal on the mapped subcarriers within the OFDM symbols, the user terminal may correct an uplink timing offset and an uplink frequency offset based on information (e.g., control information) received from the base station.

Particular aspects of the subject matter described herein may be implemented to realize one or more of the following potential advantages. The described techniques may support improvements in estimating timing and frequency offsets relating to communications between high-altitude vehicles (e.g., satellites or other non-terrestrial-based equipment) and user terminals in non-terrestrial networks, among other advantages. As such, supported techniques may include features for efficient non-terrestrial communications. The described techniques may also support increased spectral efficiency and, in some examples, may promote higher mobility support for user terminals in non-terrestrial networks compared to terrestrial networks, among other benefits.

Aspects of the disclosure are initially described in the context of a wireless communications system. Aspects of the disclosure are further described in the context of one or more additional wireless communications systems and one or more repetition patterns that relate to aspects for uplink reference signal repetition for non-terrestrial networks. Aspects of the disclosure are further illustrated by and described with reference to apparatus diagrams, system diagrams, and flowcharts that relate to several aspects related to uplink reference signal repetition for non-terrestrial networks.

FIG. 1 illustrates an example of a wireless communications system 100 that supports uplink reference signal repetition for non-terrestrial networks in accordance with one or more aspects of the present disclosure. The wireless communications system 100 includes base stations 105, user terminals 115, satellites 120, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, or communications with low-cost and low-complexity devices.

Base stations 105 may wirelessly communicate with user terminals 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The user terminals 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various user terminals 115 is supported. Each base station 105 may provide communication coverage for a respective geographic coverage area 110 via communication links 125, and communication links 125 between a base station 105 and a user terminal 115 may utilize one or more carriers. Communication links 125 shown in wireless communications system 100 may include uplink transmissions from a user terminal 115 to a base station 105, or downlink transmissions from a base station 105 to a user terminal 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

User terminals 115 may be dispersed throughout the wireless communications system 100, and each user terminal 115 may be stationary or mobile. A user terminal may be any device capable of transmitting signals to a satellite. Examples of a user terminal may include a relay equipment configured to relay a signal between a satellite and the user terminal, or a combination thereof. A user terminal 115 may also be referred to as a user equipment (UE), a mobile device, a wireless device, a remote device, a handheld device, or a subscriber device, or some other suitable terminology, where the "device" may also be referred to as a unit, a station, a terminal, or a client. A user terminal 115 may also be a personal electronic device such as a cellular phone, a personal digital assistant (PDA), a multimedia/entertainment device (e.g., a radio, a MP3 player, a video device), a camera, a gaming device, a navigation/positioning device (e.g., GNSS (global navigation satellite system) devices based on, for example, GPS (global positioning system), Beidou, GLONASS, or Galileo, a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a user terminal 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some user terminals 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some user terminals 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some examples, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NBT) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), and NB-IoT may include eNB-IoT (enhanced NB-IoT), or FeNB-IoT (further enhanced NB-IoT).

Some user terminals 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for user terminals 115 include entering a power saving "deep sleep" mode when not engaging in active communications, or operating over a limited bandwidth (e.g., according to narrowband communications). In some cases, user terminals 115 may be designed to support critical functions (e.g., mission critical functions), and a wireless communications system 100 may be configured to provide ultra-reliable communications for these functions.

In some cases, a user terminal 115 may also be able to communicate directly with other user terminals 115 (e.g., using a peer-to-peer (P2P) or device-to-device (D2D) protocol). One or more of a group of user terminals 115 utilizing D2D communications may be within the geographic coverage area 110 of a base station 105. Other user terminals 115 in such a group may be outside the geographic coverage area 110 of a base station 105, or be otherwise unable to receive transmissions from a base station 105. In some cases, groups of user terminals 115 communicating via D2D communications may utilize a one-to-many (1:M) system in which each user terminal 115 transmits to every other user terminal 115 in the group. In some cases, a base station 105 facilitates the scheduling of resources for D2D communications. In other cases, D2D communications are carried out between user terminals 115 without the involvement of a base station 105.

A base station 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for user terminals 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with user terminals 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may be a wireless local area network (WLAN), such as a Wi-Fi (e.g., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. Components within a wireless communication system may be coupled (for example, operatively, communicatively, functionally, electronically, and/or electrically) to each other.

Wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to user terminals 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users. The wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between user terminals 115 and base stations 105, and EHF antennas of the respective devices may be even smaller and more closely spaced than UHF antennas. In some examples, this may facilitate use of antenna arrays within a user terminal 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, the wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and user terminals 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or user terminal 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a user terminal 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a user terminal 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a user terminal 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a user terminal 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a user terminal 115). In some examples, the beam direction associated with transmissions along a single beam direction may be determined based at least in in part on a signal that was transmitted in different beam directions. For example, a user terminal 115 may receive one or more of the signals transmitted by the base station 105 in different directions, and the user terminal 115 may report to the base station 105 an indication of the signal it received with a highest signal quality, or an otherwise acceptable signal quality. Although these techniques are described with reference to signals transmitted in one or more directions by a base station 105, a user terminal 115 may employ similar techniques for transmitting signals multiple times in different directions (e.g., for identifying a beam direction for subsequent transmission or reception by the user terminal 115), or transmitting a signal in a single direction (e.g., for transmitting data to a receiving device).

A receiving device (e.g., a user terminal 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or user terminal 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a user terminal 115. Likewise, a user terminal 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a user terminal 115 and a base station 105 or core network 130 supporting radio bearers for user plane data. At the Physical (PHY) layer, transport channels may be mapped to physical channels.

In some cases, user terminals 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs). In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a user terminal 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by user terminals 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more user terminal-specific control regions or user terminal-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served user terminal 115 may be configured for operating over portions or all of the carrier bandwidth. In other examples, some user terminals 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a user terminal 115 receives and the higher the order of the modulation scheme, the higher the data rate may be for the user terminal 115. In MIMO systems, a wireless communications resource may refer to a combination of a radio frequency spectrum resource, a time resource, and a spatial resource (e.g., spatial layers), and the use of multiple spatial layers may further increase the data rate for communications with a user terminal 115.

Devices of the wireless communications system 100 (e.g., base stations 105 or user terminals 115) may have a hardware configuration that supports communications over a particular carrier bandwidth, or may be configurable to support communications over one of a set of carrier bandwidths. In some examples, the wireless communications system 100 may include base stations 105 and/or user terminals 115 that support simultaneous communications via carriers associated with more than one different carrier bandwidth. Wireless communications system 100 may support communication with a user terminal 115 on multiple cells or carriers, a feature which may be referred to as carrier aggregation or multi-carrier operation. A user terminal 115 may be configured with multiple downlink component carriers and one or more uplink component carriers according to a carrier aggregation configuration. Carrier aggregation may be used with both FDD and TDD component carriers. In some cases, wireless communications system 100 may utilize enhanced component carriers (eCCs).

An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by user terminals 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a user terminal 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable. The wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communications system 100 may also include one or more satellites 120. Satellite 120 may communicate with base stations 105 and user terminals 115 (such as UEs). Satellite 120 may be any suitable type of communication satellite configured to relay communications between different end nodes in a wireless communication system. Satellite 120 may be an example of a space satellite, a balloon, a dirigible, an airplane, a drone, an unmanned aerial vehicle, or another similar platform. In some examples, the satellite 120 may be in a geosynchronous or geostationary earth orbit, a low earth orbit or a medium earth orbit. A satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of a non-terrestrial network. A satellite 120 may, in some cases, perform the functions of a base station 105. In this case, the satellite 120 may directly communicate with the Internet without going through a ground base station (e.g., base station 105). In other cases, satellite 120 may be an example of a relay transponder for a ground base station. A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 120) may receive a signal from a base station 105 and may relay the signal to a user terminal 115 or base station 105, or vice-versa.

User terminals 115 may include a user terminal communications manager 101, which may manage communications in a non-terrestrial network communications system. For a user terminal 115, user terminal communications manager 101 may identify, based on an indication received from a non-terrestrial network, an uplink reference signal format that includes a comb-based pattern of subcarriers within multiple OFDM symbols, for example, such as a first OFDM symbol and within a second OFDM symbol for transmission of an uplink reference signal. The user terminal communications manager 101 may map the uplink reference signal to a plurality of subcarriers within multiple OFDM symbols. For example, the user terminal communications manager 101 may map a first plurality of subcarriers within a first OFDM symbol and to a second plurality of subcarriers within a second OFDM symbol in accordance with the comb-based pattern. The user terminal communications manager 101 may transmit, to base station communications manager 102, the uplink reference signal on mapped subcarriers within multiple OFDM symbols. For example, the user terminal communications manager 101 may transmit, to base station communications manager 102, the uplink reference signal on the first plurality of subcarriers within the first OFDM symbol and on the second plurality of subcarriers within the second OFDM symbol. The first OFDM symbol and the second OFDM symbol may be transmitted coherently.

One or more of the base stations 105 or satellites 120 may also include a base station communications manager 102, which may manage communications in a non-terrestrial network communications system. For a base station 105, base station communications manager 102 may determine (and configure) an uplink reference signal format for an uplink reference signal to be transmitted from a user terminal in a non-terrestrial network. The uplink reference signal formation may include a comb-based pattern of subcarriers within multiple OFDM symbols. Uplink reference signals transmitted on a same OFDM symbol with different comb-based patterns may be orthogonal to each other. As a result, the comb-based OFDM transmission allows multiple user terminals 115 to transmit at the same time without mutual interference. For example, the base station communications manager 102 may determine (and configure) an uplink reference signal format that includes a comb-based pattern of a first OFDM symbol and within a second OFDM symbol for transmission of an uplink reference signal. The base station communications manager 102 may transmit an indication of the uplink reference signal format to a user terminal in a non-terrestrial network, for example, such as user terminal communications manager 101 of a user terminal 115. The base station communications manager 102 may receive, from user terminals 115 in the non-terrestrial network, the uplink reference signal on subcarriers within multiple OFDM symbols. For example, the base station communications manager 102 may receive the uplink reference signal on the first plurality of subcarriers within the first OFDM symbol and on the second plurality of subcarriers within the second OFDM symbol. The first OFDM symbol and the second OFDM symbol may be transmitted coherently.

The wireless communications system 100 may therefore provide efficacy to user terminals 115 by providing improvements in estimating timing and frequency offsets in non-terrestrial networks. Additionally, the wireless communications system 100 may therefore provide efficacy to user terminals 115 by providing improvements in estimating timing and frequency offsets in terrestrial networks. The wireless communications system 100 may also support increased spectral efficiency and, in some examples, may support higher mobility for user terminals 115, among other benefits by supporting uplink reference signal repetition. Uplink reference signal repetition may include, for example, repetition of a sounding reference signal, and is further described in more detail herein with reference to FIGS. 2, 3A and 3B, 4.

Figure 2:
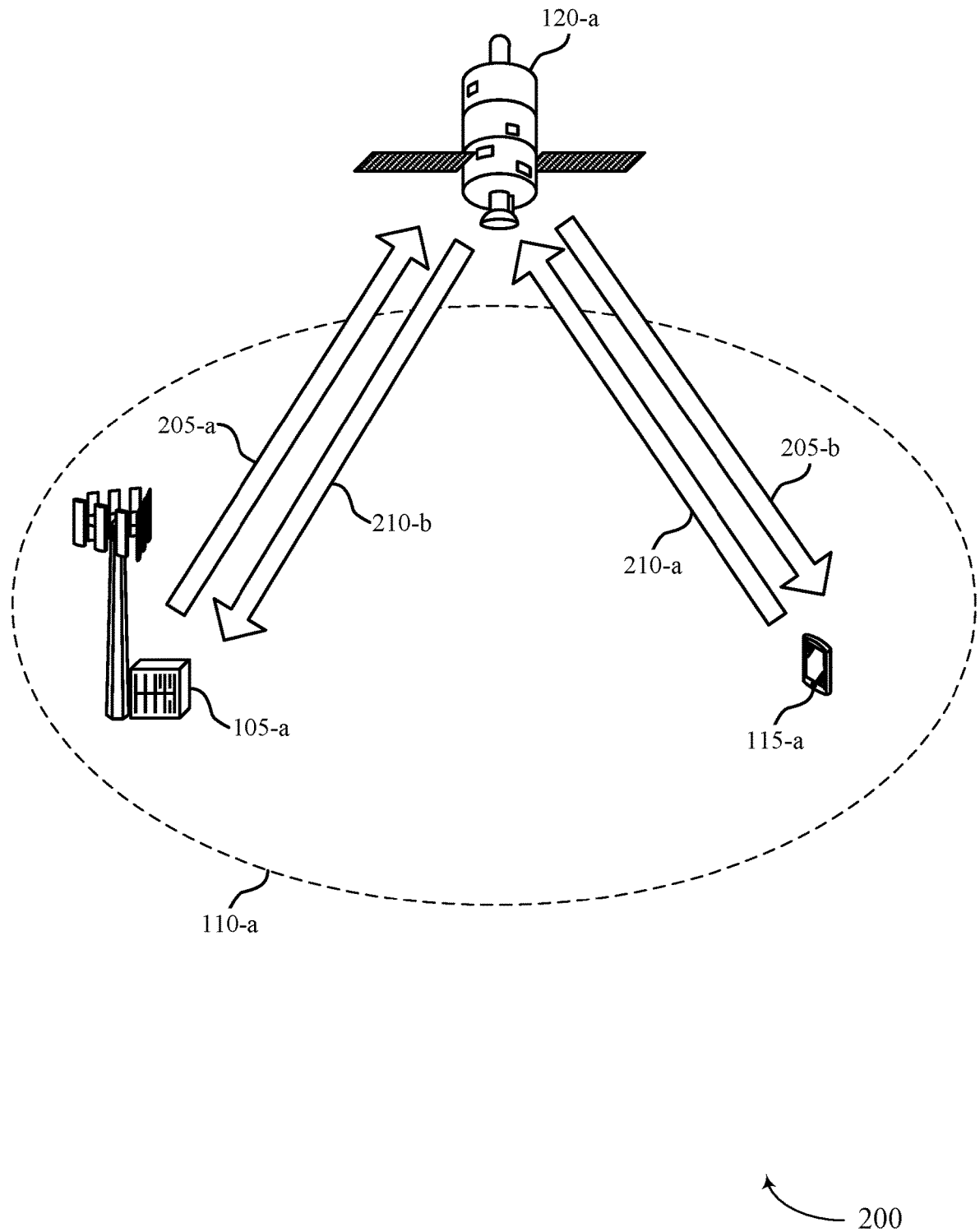

FIG. 2 illustrates an example of a wireless communication system 200 that supports uplink reference signal repetition for non-terrestrial networks in accordance with one or more aspects of the present disclosure. In some examples, the wireless communication system 200 may implement aspects of the wireless communication system 100. For example, the wireless communication system 200 may include a base station 105 a, a user terminal 115 a, and a satellite 120-a, which may be examples of a base station 105, a user terminal 115, and a satellite 120 as described with reference to FIG. 1. The wireless communication system 200 may support improved non-terrestrial communications, higher data rates, increased spectral efficiency, higher mobility support for user terminals and, in some examples, may promote low latency of non-terrestrial communications, among other benefits.

The wireless communications system 200 may provide geographic coverage area 110-a by using high-altitude vehicles between the base station 105-a and the user terminal 115-a. The base station 105-a may therefore serve a geographic coverage area 110-a with assistance of or through the satellite 120-a. In some examples, the base station 105-a may not have its own ground geographic coverage area. For example, the base station 105-a may communicate to the satellite 120-a without directly communicating to any ground user terminals, such as, for example, user terminal 115-a. In some examples, a ground base station (e.g., base station 105-a) may be a gateway (e.g., in this case, the satellite 120-a can itself function as a base station (i.e., can perform scheduling, radio link control)). A non-terrestrial network may be absent of ground base stations that directly communicate with user terminals without relaying communications through satellites. In some other examples, a non-terrestrial network may be formed of satellites and be absent of any ground base stations. In some examples, the satellite 120-a may relay communications between the base station 105-a and the user terminal 115-a. For example, the base station 105-a may communicate with the user terminal 115-a via the satellite 120-a or vice-versa. In some examples, for communications originating at the base station 105-a and going to the user terminal 115-a, the base station 105-a may transmit an uplink transmission 205-a to the satellite 120-a. The satellite 120-a may relay the uplink transmission 205-a as a downlink transmission 205-b to the user terminal 115-a. In other examples, for communications originating at the user terminal 115-a and going to the base station 105-a, the user terminal 115-a may transmit an uplink transmission 210-a to the satellite 120-a. The satellite 120-a may relay the uplink transmission 210-a as a downlink transmission 210-b to base station 105-b.

The base station 105-a and the satellite 120-a may be thousands of kilometers apart and it may take some time for electromagnetic waves to propagate over the distance between the base station 105-a and the satellite 120-a and between the satellite 120-a and the user terminal 115-a. The propagation delay for non-terrestrial networks may be many orders of magnitude larger than the propagation delay for terrestrial networks. As such, the round trip delay associated with a transmission may also be orders of magnitude larger for non-terrestrial networks than for terrestrial networks. In addition, high speeds of non-geostationary satellites, for example, such as the satellite 120-a may promote variations in round trip delay and Doppler. As a result, the user terminal 115-a may experience variations in uplink timing and frequency synchronization with the satellite 120-a.

By way of example, the satellite 120-a may be in an orbit, such as low earth orbit, medium earth orbit, or non-geostationary earth orbit. In many of these examples, the satellite 120-a may be many thousands of kilometers from earth, and therefore may be thousands of kilometers from the base station 105-a and the user terminal 115-a. Each transmission 205 or 210 between the base station 105-a and the user terminal 115-a may therefore travel from earth the distance to the satellite 120-a and back to earth. The distance that a transmission travels may increase the propagation delay of a transmission or round trip delay associated with the transmission. The propagation delay may refer to a duration it takes for a signal to travel from its source to its intended recipient. The round trip delay may refer to a duration it takes for a transmission to be transmitted from a source to its intended recipient, processed by the intended recipient, and a response transmitted from the intended recipient of the transmission back to the source.

The user terminal 115-a may support a closed-loop timing and frequency control to maintain an uplink timing and frequency synchronization (or uplink timing and frequency accuracy) with the satellite 120-a. The user terminal 115-a may support use of uplink reference signals, for example, sounding reference signals to provide a robust timing and frequency measurement to the base station 105-a, to maintain an uplink timing and frequency synchronization with the satellite 120-a, as well as handle larger timing and frequency errors. The user terminal 115-a, in some examples, may rely on network signaled round trip delay information or a round trip delay variation rate (of a beam center of the satellite 120-a) when the user terminal 115-a is unable to determine its geolocation within the geographic coverage area 110-a. When the satellite 120-a is in a low-earth orbit, the satellite 120-a may be between 600 km to 2000 km from earth. In the example of a low earth orbit location of the satellite 120-a, for example, such as a 1200 km orbit from earth with an elevation angle of 30° the round trip delay variation rate may be on the order of 35 microseconds (μs) per second (s) (μs/s).

A timing error between the user terminal 115-a and the satellite 120-a may be based on one or more of a round trip delay variation rate, an uplink reference signal period, and a factor applied to the uplink reference signal period. The user terminal 115-a, in some examples, may support an open-loop timing and frequency control along with the round trip delay variation rate (of a beam center of the satellite 120-a) to maintain an uplink timing and frequency synchronization (or uplink timing and frequency accuracy) with the satellite 120-a. In an example, a pulling range may be reduced on the order of 10 μs/s according to the open-loop timing and frequency control.

A frequency error between the user terminal 115-a and the satellite 120-a may be based on one or more of an on-board mixer frequency error (of the satellite 120-a), a residual feeder link Doppler (e.g., the uplink transmission 205-a from the base station 105-a to the satellite 120-a and the downlink transmission from the satellite 120-a to the base station 105-a), an unknown service link Doppler (e.g., the downlink transmission 205-b from the satellite 120-a to the user terminal 115-a and the uplink transmission from the user terminal 115-a to the satellite 120-a), or a user terminal oscillator frequency error. In some examples, based on the service link Doppler (e.g., the downlink transmission 205-b from the satellite 120-a to the user terminal 115-a and the uplink transmission from the user terminal 115-*a* to the satellite 120-*a*), the user terminal 115-*a* and the satellite 120-*a* may correct a frequency error according to one or more of a differential Doppler, an uplink reference signal periodicity, and a factor applied to the uplink reference signal periodicity. The differential Doppler may be a Doppler difference associated with different user terminals within a coverage of a satellite beam. In the example of a low earth orbit location of the satellite 120-*a*, for example, such as a 1200 km orbit from earth with a beam radius of 50 km (e.g., nadir beam), a differential Doppler may be one part per million (1 ppm) (i.e., the differential Doppler is 30 kHz when the carrier frequency is 30 GHz).

Closed-loop timing and frequency control has shown a significant timing error (e.g., timing variation) and frequency error relative to subcarrier spacing relating to communications between the base station 105-*a* and the user terminal 115-*a* via the satellite 120-*a*. In some examples, relying on measurements using uplink data transmission may be insufficient for the user terminal 115-*a* to estimate and correct the timing and frequency errors. For example, there may not always be an uplink data transmission and the timing without closed-loop control may be out of range. As such, larger frequency error in data transmission may cause significant interference to other user terminals.

The wireless communications system 200 may support periodic uplink reference signals used for channel sounding (e.g., channel delay profiling) to estimate and correct timing and frequency errors. As described herein, the user terminal 115-*a* may support uplink reference signal repetition of multiple OFDM symbols, and more specifically improvements in non-terrestrial communications, higher data rates, increased spectral efficiency, among other benefits. For example, the described techniques may address shortcomings of present reference signaling schemes that lack capabilities for estimation of timing and frequency offsets (i.e., present reference signaling schemes provide inaccurate estimation of timing and frequency offsets). Examples of multisymbol uplink reference signal schemes are described with reference to FIGS. 3A and 3B, and are discussed in more detail below.

Figure 3A:
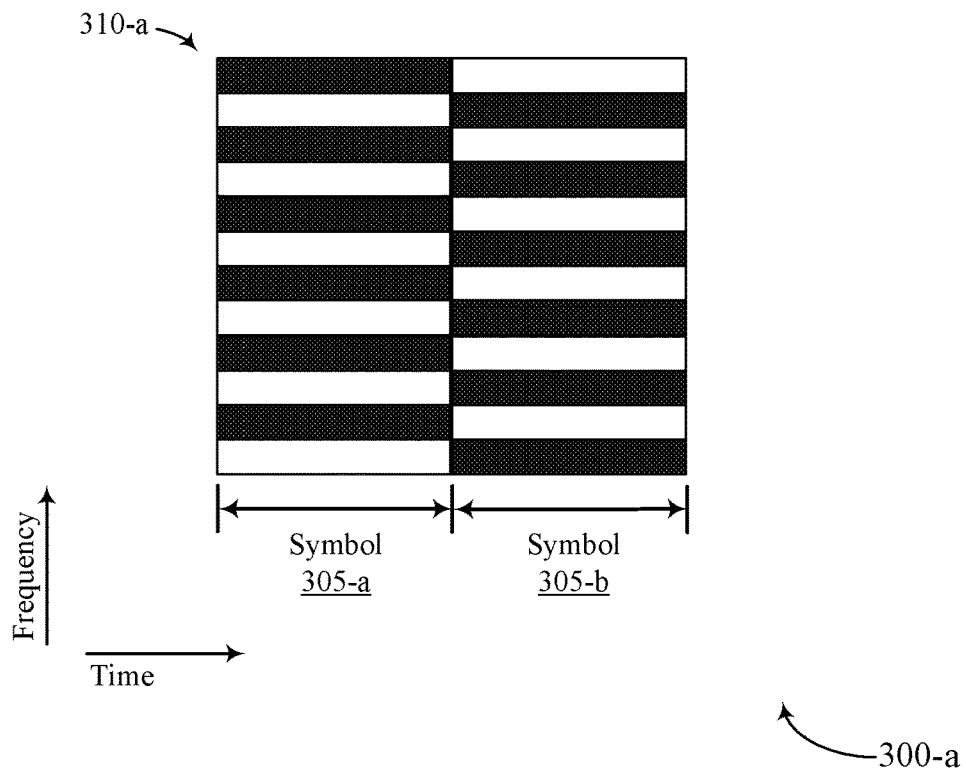
FIGS. 3A and 3B illustrate examples of temporal patterns that support uplink reference signal repetition for non-terrestrial networks in accordance with one or more aspects of the present disclosure.

FIG. 3A illustrates an example of a temporal pattern 300-*a* that supports uplink reference signal repetition for non-terrestrial networks in accordance with one or more aspects of the present disclosure. In some examples, the temporal pattern 300-*a* may implement aspects of the wireless communications systems 100 and 200, as described with reference to FIGS. 1 and 2. For example, the temporal pattern 300-*a* may be based on a configuration by a base station 105, and implemented by a user terminal 115 for estimating and correcting timing and frequency offsets in a non-terrestrial network, as described with reference to FIGS. 1 and 2.

In the example of FIG. 3A, uplink reference signal 310-*a* may span a portion or an entirety of symbols 305-*a*, 305-*b* (e.g., OFDM symbols). Symbols 305-*a*, 305-*b* may be consecutive. In some examples, symbols 305-*a*, 305-*b* may be two coherent non-zero symbols (e.g., the phase difference between the two symbols may be known and fixed at a transmitter output). The uplink reference signal 310-*a* may occupy time and frequency resources related to the symbols 305-*a* and 305-*b*, which may include symbol periods and subcarriers. For example, the uplink reference signal 310-*a* may map to a resource element corresponding to the symbols 305-*a* and 305-*b*. The resource element may span one subcarrier by one symbol. In some examples, the uplink reference signal 310-*a* may follow a comb-based pattern, which may include an uplink reference signal occupying certain time and frequency resources according to the comb-based pattern. Although FIG. 3A simply shows two symbols 305-*a* and 305-*b*, the temporal pattern 300-*a* may be applicable to multiple symbols (e.g., more than two symbols) in accordance with one or more aspects of the present disclosure.

A user terminal 115 may identify an uplink reference signal format that includes a comb-based pattern of subcarriers within one or more symbols for transmission of an uplink reference signal, such as a sounding reference signal, a demodulation reference signal, a tracking reference signal, a positioning reference signal, or a channel state information reference signal. In some example, a base station 105 may configure and transmit an indication (e.g., via RRC signaling, control signaling) of an uplink reference signal format to a user terminal 115 with possible other configurations, such as time and frequency resources, periodicity. A comb-based pattern may include a pattern of subcarriers within symbols 305-*a* and 305-*b* for transmission of an uplink reference signal. For example, a user terminal 115 may map an uplink reference signal to a quantity of subcarriers within the symbols 305-*a* and 305-*b* according to the comb-based pattern.

Figure 3B:
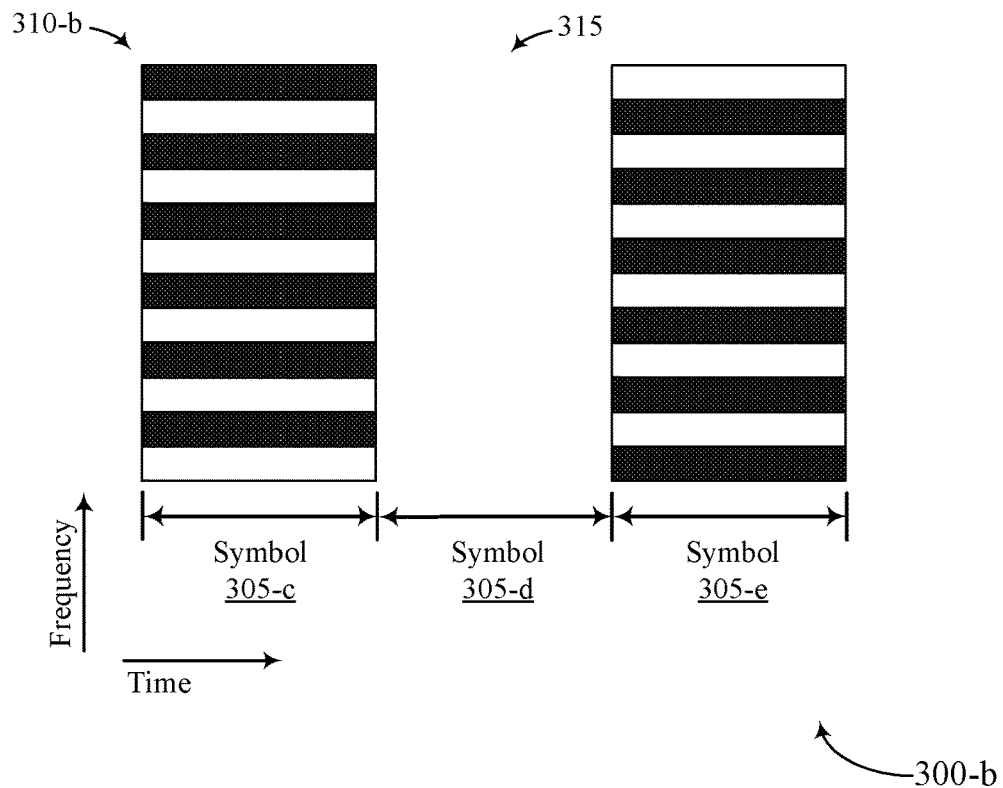

In some examples, a user terminal 115 may identify a comb configuration for an uplink reference signal and determine the comb-based pattern based on the comb configuration. The comb configuration may be a comb 2 (comb2), a comb 3 (comb3), or a comb 4 (comb4). In the example of FIGS. 3A and 3B, the comb-based pattern may have a comb configuration that is comb2. For a comb configuration of comb2, a user terminal 115 may transmit an uplink reference signal every other resource element of a symbol 305. Alternatively, for a comb configuration of comb4, a user terminal 115 may transmit an uplink reference signal every fourth resource element of a symbol 305.

In some examples, each symbol 305 of the uplink reference signal 310-*a* may have a comb-based pattern offset (e.g., the first used subcarrier among symbols 305). A comb-based pattern offset (also referred to as a comb offset) may indicate the first used subcarrier in the allocated frequency region. A comb offset 0 may indicate that the first subcarrier in the allocated frequency region is the first used subcarrier and a comb offset 1 may indicate that the second subcarrier in the allocated frequency region is the first used subcarrier. In some examples, a comb2 may have two offsets: 0 and 1, while a comb4 may have four offsets: 0, 1, 2, and 3. For example, the symbol 305-*a* may have a comb offset 0 and the symbol 305-*b* may have a comb offset 1. In the example of FIG. 3A, symbols 305-*a* and 305-*b* may have different comb offsets. In other examples, symbols 305-*a* and 305-*b* in an uplink reference signal may have the same comb offset. In some examples, the comb offset may be applied sequentially to the symbols 305-*a*, 305-*b*. As such, symbol 305-*a* may have a different frequency offset than symbol 305-*b*. For example, the comb offset of a nonzero OFDM symbol k in an uplink reference signal may be defined as mod(k+offset of first symbol, comb level), where the comb level may be the distance in subcarriers between two nonzero subcarriers in a comb pattern (e.g., 2 for comb2, 4 for comb4). In these cases, the network may configure the comb offset of the first symbol in order for a user terminal to determine the offsets of the remaining symbols.

A user terminal may map an uplink reference signal according to one or more subcarriers within the symbols 305-*a* and 305-*b* according to a comb-based pattern. To support improved non-terrestrial communications, higher data rates, increased spectral efficiency, higher mobility support, among other benefits, a user terminal 115 may transmit to a base station directly (or indirectly via a satellite 120), an uplink reference signal on the subcarriers within the symbols 305-*a* and 305-*b* coherently. A user terminal may correct one or more of an uplink timing offset and an uplink frequency offset based on transmitting the uplink reference signal.

FIG. 3B illustrates an example of a temporal pattern 300-*b* that supports uplink reference signal repetition for non-terrestrial networks in accordance with one or more aspects of the present disclosure. In some examples, the temporal pattern 300-*b* may implement aspects of the wireless communications systems 100 and 200, as described with reference to FIGS. 1 and 2. For example, the temporal pattern 300-*b* may be based on a configuration by a base station 105, and implemented by a user terminal 115 for estimating and correcting timing and frequency offsets in a non-terrestrial network, as described with reference to FIGS. 1 and 2.

In the example of FIG. 3B, uplink reference signal 310-*b* may span a portion or an entirety of symbols 305-*c* and 305-*e* (e.g., OFDM symbols). Symbols 305-*c* and 305-*e* may be non-consecutive. For example, symbols 305-*c* and 305-*e* may be two coherent non-zero symbols (e.g., a phase difference between the two symbols may be known and fixed at a transmitter output) with a configurable temporal gap 315 spanning a portion or an entirety of symbol 305-*d* (e.g., OFDM symbol). In some examples, the temporal gap 315 may be based on one or more of a performance accuracy level or a reference signal pulling range. The uplink reference signal 310-*b* may occupy time and frequency resources related to the symbols 305-*c* and 305-*e*, which may include symbol periods and subcarriers. For example, the uplink reference signal 310-*b* may map to a resource element corresponding to the symbols 305-*c* and 305-*e*. The resource element may span one subcarrier by one symbol. Similarly to FIG. 3A, the uplink reference signal 310-*b* may follow a comb-based pattern, which may include an uplink reference signal occupying certain time and frequency resources according to the comb-based pattern. Although FIG. 3B shows three symbols 305-*c*, 305-*d*, and 305-*e* the temporal pattern 300-*b* may be applicable to multiple symbols (i.e., more than three symbols) in accordance with one or more aspects of the present disclosure.

A user terminal 115 may identify an uplink reference signal format that includes a comb-based pattern of subcarriers within one or more symbols for transmission of an uplink reference signal, such as a sounding reference signal. In some example, a base station 105 may configure and transmit an indication (e.g., via higher layer signaling) of an uplink reference signal format to a user terminal 115, as well as additional configurations, such as time and frequency resources, periodicity. A comb-based pattern may include a pattern of subcarriers within symbols 305-*c* and 305-*e* for transmission of an uplink reference signal. For example, a user terminal 115 may map an uplink reference signal to a quantity of subcarriers within the symbols 305-*c* and 305-*e* according to the comb-based pattern.

In some examples, a user terminal 115 may identify a comb configuration for an uplink reference signal and determine the comb-based pattern based on the comb configuration. The comb configuration may be a comb2, a comb3, or a comb4. In the example of FIG. 3B, the comb-based pattern may have a comb configuration that is comb2. For a comb configuration of comb2, a user terminal 115 may transmit an uplink reference signal every other resource element of a symbol 305. Alternatively, for a comb configuration of comb4, a user terminal 115 may transmit an uplink reference signal every fourth resource element of a symbol 305.

In some examples, each symbol 305 of the uplink reference signal 310-*b* may have a comb-based pattern offset (e.g., the first used subcarrier among symbols 305). A comb-based pattern offset (also referred to as a comb offset) may indicate the first used subcarrier in the allocated frequency region. A comb offset 0 may indicate that the first subcarrier in the allocated frequency region is the first used subcarrier and a comb offset 1 may indicate that the second subcarrier in the allocated frequency region is the first used subcarrier. In some examples, a comb2 may have two offsets: 0 and 1, while a comb4 may have four offsets: 0, 1, 2, and 3. For example, the symbol 305-*c* may have a comb offset 0 and the symbol 305-*e* may have a comb offset 1. In the example of FIG. 3B, the symbols 305-*c*, 305-*e* may have different comb offsets. In some other examples, the symbols 305-*c*, 305-*e* of the uplink reference signal 310-*b* may have a same comb offset.

A user terminal may map an uplink reference signal according to one or more subcarriers within the symbols 305-*c*, 305-*e* according to a comb-based pattern. To support improved non-terrestrial communications, among other benefits (e.g., addressing ambiguity of half-symbol offsets due to comb2), a user terminal 115 may transmit to a base station directly (or indirectly via a satellite 120), an uplink reference signal on the subcarriers within the symbols 305-*c*, 305-*e* coherently. As such, a user terminal 115 may maintain a phase coherence. A user terminal may correct one or more of an uplink timing offset and an uplink frequency offset based on transmitting the uplink reference signal.

Figure 4:
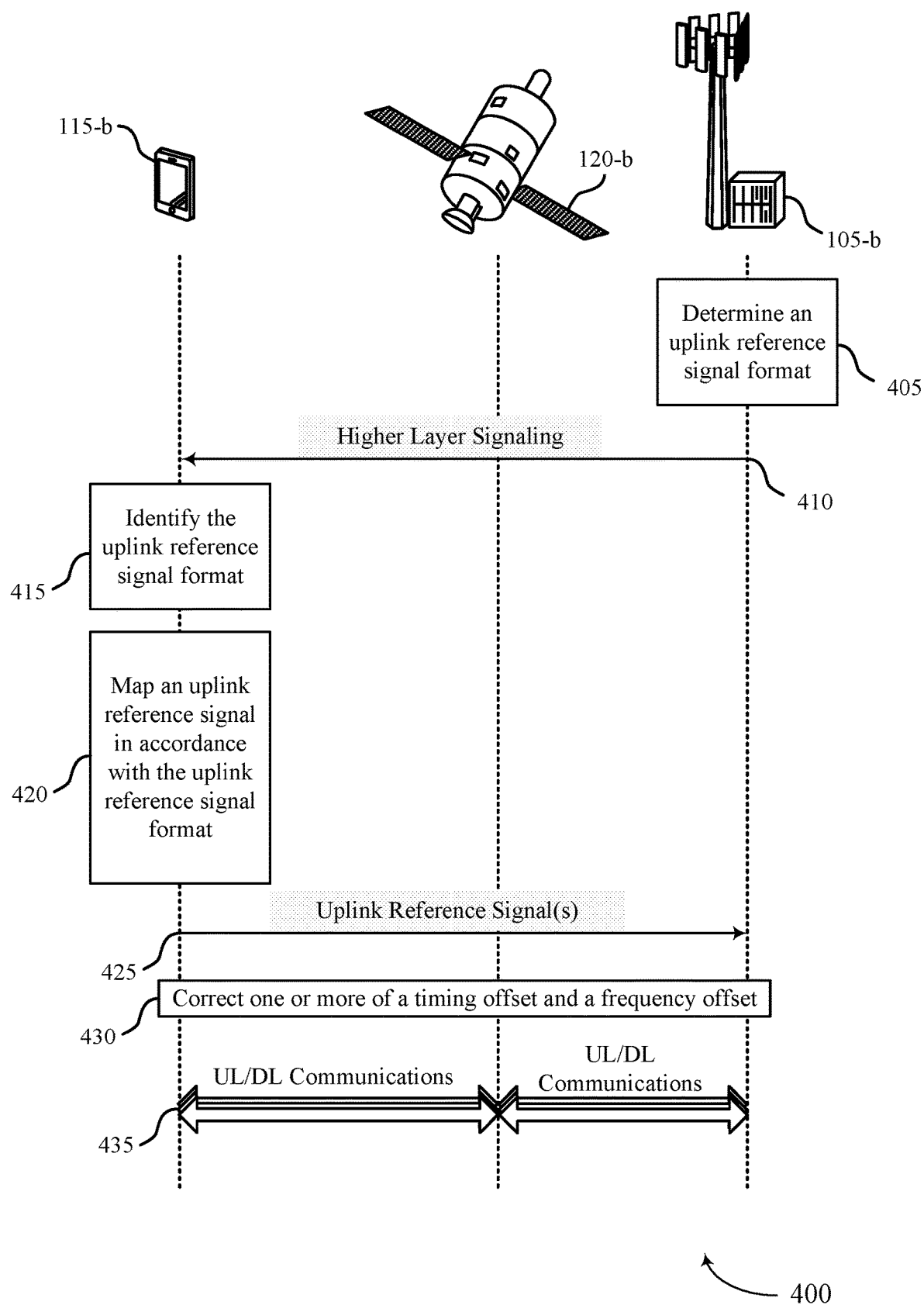
FIG. 4 illustrates an example of a process flow that supports uplink reference signal repetition for non-terrestrial networks in accordance with one or more aspects of the present disclosure.

FIG. 4 illustrates an example of a process flow 400 that supports uplink reference signal repetition for non-terrestrial networks in accordance with one or more aspects of the present disclosure. The process flow 400 may implement aspects of the wireless communications systems 100 and 200, as described with reference to FIGS. 1 and 2. For example, the process flow 400 may be based on a configuration by a base station, and implemented by a user terminal for estimating and correcting timing and frequency offsets in a non-terrestrial network, as described with reference to FIGS. 1 and 2.

The process flow 400 may include a base station 105-*b*, a user terminal 115-*b*, and a satellite 120-*b*, which may be examples of a base station 105, a user terminal 115, and a satellite 120 as described with reference to FIG. 1. In the following description of the process flow 400, the operations between the base station 105-*b*, the user terminal 115-*b*, and the satellite 120-*b* may be transmitted in a different order than the example order shown, or the operations performed by the base station 105-*b*, the user terminal 115-*b*, and the satellite 120-*b* may be performed in different orders or at different times. Some operations may also be omitted from the process flow 400, and other operations may be added to the process flow 400. In the example of FIG. 4, the base station 105-*b*, the user terminal 115-*b*, and the satellite 120-*b* may be in communication with each other via a non-terrestrial network. The process flow 400 may support higher data rates, improved mobility support for the user terminal 115-*b* in the non-terrestrial network, among other benefits.

At 405, the base station 105-*b* may determine an uplink reference signal format. For example, the base station 105-*b* may determine (or configure) an uplink reference signal format for an uplink reference signal to be transmitted from the user terminal 115-*b*. In some examples, the uplink reference signal format may include a comb-based pattern of subcarriers within one or more OFDM symbols. The comb-based pattern may have a comb configuration, which may include a comb2 or comb4 configuration. At 410, the base station 105-*b* may transmit the uplink reference signal format via higher layer signaling (e.g., RRC signaling), for example, to the user terminal 115-*b*.

At 415, the user terminal 115-*b* may identify the uplink reference signal format. At 420, the user terminal 115-*b* may map an uplink reference signal in accordance with the uplink reference signal format. For example, the user terminal 115-*b* may map an uplink reference signal to a first set of subcarriers within a first OFDM symbol and to a second set of subcarriers within a second OFDM symbol according to a comb-based pattern included in the uplink reference signal format. The first OFDM symbol and the second OFDM symbol may be, in some examples, consecutive or non-consecutive. In some examples, the comb-based pattern may have a comb-based pattern offset, for example, the second set of subcarriers within the second OFDM symbol may have a frequency offset from the first set of subcarriers within the first OFDM symbol. In some other example, there may be a temporal gap configuration between the first OFDM symbol and the second OFDM symbol, and the temporal gap configuration may be based on one or more of an accuracy level or a reference signal pulling range.

At 425, the user terminal 115-*b* may transmit one or more uplink reference signals coherently, for example, to the base station 105-*b* directly or indirectly via the satellite 120-*b*. At 430, the process flow 400 may proceed with the base station 105-*b*, the user terminal 115-*b*, and the satellite 120-*b* correcting one or more of a timing offset and a frequency offset. For example, the base station 105-*b*, the user terminal 115-*b*, and the satellite 120-*b* correcting one or more of a timing offset and a frequency offset based on feedback from the non-terrestrial network according to the transmitted uplink reference signals from the user terminal 115-*b*. At 435, the process flow 400 may proceed with the base station 105-*b*, the user terminal 115-*b*, and the satellite 120-*b* communicating uplink and downlink communications, for example, such as control information, data, over one or more carriers over one or more symbols.

The operations performed by the base station 105-*b*, the user terminal 115-*b*, and the satellite 120-*b* as part of, but not limited to, process flow 400 may provide improvements to user terminal 115-*b* uplink transmissions. Furthermore, the operations performed by the base station 105-*b*, the user terminal 115-*b*, and the satellite 120-*b* as part of, but not limited to, process flow 400 may provide benefits and enhancements to the operation of the user terminal 115-*b*. For example, the described uplink reference signal repetition in the process flow 400 may support improved data rates and enhanced uplink transmission reliability, among other advantages.

Figure 5:
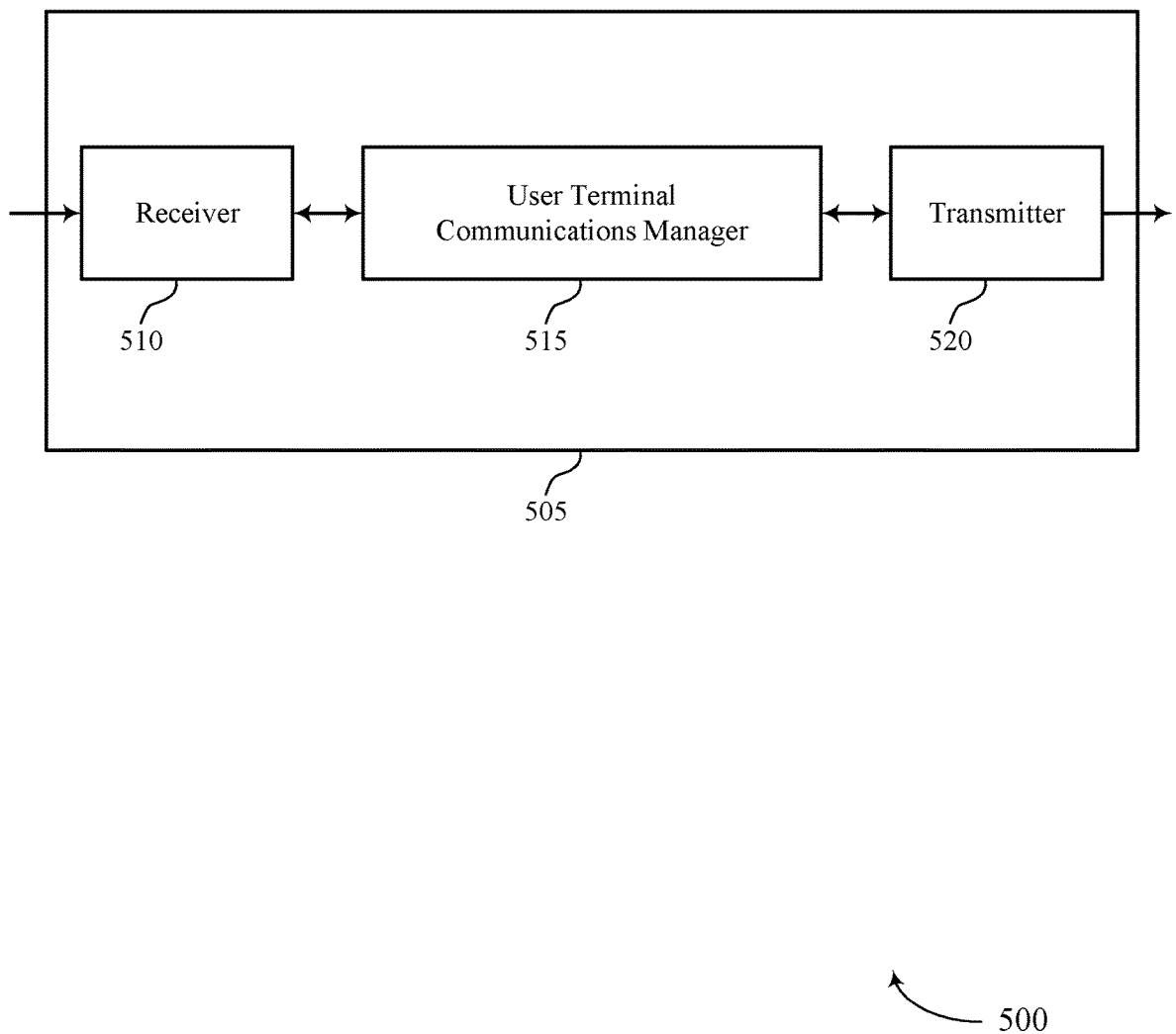
FIGS. 5 and 6 show block diagrams of devices that support uplink reference signal repetition for non-terrestrial networks in accordance with aspects of the present disclosure.

FIG. 5 shows a block diagram 500 of a device 505 that supports uplink reference signal repetition for non-terrestrial networks in accordance with aspects of the present disclosure. The device 505 may be an example of aspects of a user terminal 115 as described herein. The device 505 may include a receiver 510, a user terminal communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink reference signal repetition for non-terrestrial networks). Information may be passed on to other components of the device 505. The receiver 510 may be an example of aspects of the transceiver 820 described with reference to FIG. 8. The receiver 510 may utilize a single antenna or a set of antennas.

The user terminal communications manager 515 may be implemented as an integrated circuit or chipset for the device 505, and the receiver 510 and the transmitter 520 may be implemented as analog components (for example, amplifiers, filters, antennas) coupled with the device 505 modem to enable wireless transmission and reception The actions performed by the user terminal communications manager 515 as described herein may be implemented to realize one or more potential advantages. For example, the user terminal communications manager 515 may identify an uplink reference signal format for transmission of an uplink reference signal based on an indication received from the non-terrestrial network. The uplink reference signal format includes a comb-based pattern of subcarriers within a first OFDM symbol and within a second OFDM symbol for transmission of the uplink reference signal. The user terminal communications manager 515 may map the uplink reference signal to a first set of subcarriers within the first OFDM symbol and to a second set of subcarriers within the second OFDM symbol in accordance with the comb-based pattern, and transmit the uplink reference signal on the first set of subcarriers within the first OFDM symbol and on the second set of subcarriers within the second OFDM symbol, where the first OFDM symbol and the second OFDM symbol are transmitted coherently. Based on implementing the mapping according to the comb-based pattern, one or more processors of the device 505 (for example, processor(s) controlling or incorporated with the user terminal communications manager 515) may promote improvements to power consumption, spectral efficiency, higher data rates and, in some examples, may promote enhanced efficiency for high reliability and low latency operations, among other benefits by supporting uplink reference signal repetition for non-terrestrial networks. The user terminal communications manager 515 may be an example of aspects of the user terminal communications manager 810 described herein.

The user terminal communications manager 515, or its sub-components, may be implemented in hardware, software (e.g., executed by a processor), or any combination thereof. If implemented in code executed by a processor, the functions of the user terminal communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The user terminal communications manager 515, or its sub-components, may be physically located at various positions, including being distributed such that portions of functions are implemented at different physical locations by one or more physical components. In some examples, the user terminal communications manager 515, or its sub-components, may be a separate and distinct component in accordance with various aspects of the present disclosure. In some examples, the user terminal communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver component. For example, the transmitter 520 may be an example of aspects of the transceiver 820 described with reference to FIG. 8. The transmitter 520 may utilize a single antenna or a set of antennas.

Figure 6:
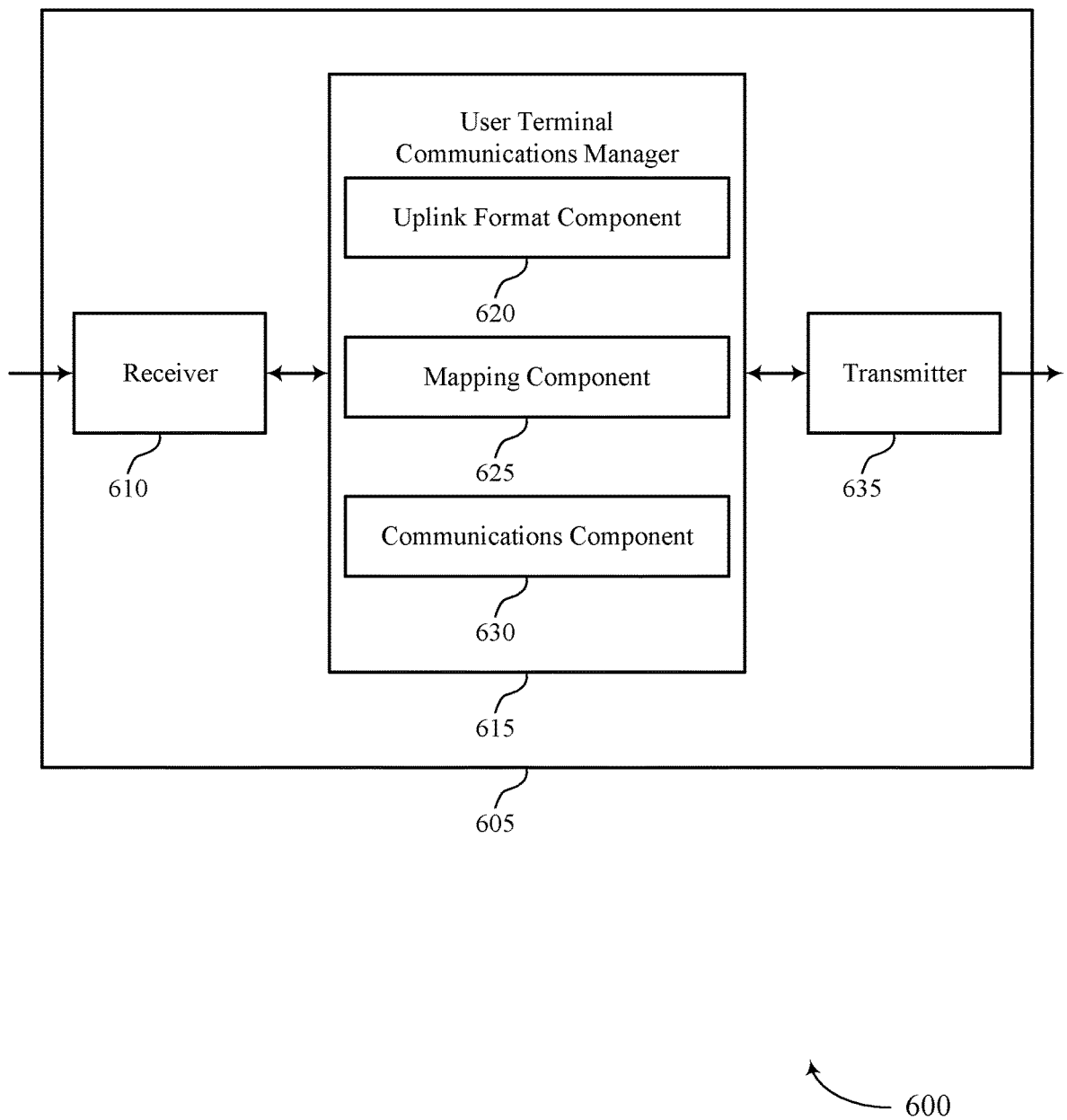

FIG. 6 shows a block diagram 600 of a device 605 that supports uplink reference signal repetition for non-terrestrial networks in accordance with aspects of the present disclosure. The device 605 may be an example of aspects of a device 505, or a user terminal 115 as described herein. The device 605 may include a receiver 610, a user terminal communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to uplink reference signal repetition for non-terrestrial networks). Information may be passed on to other components of the device 605. The receiver 610 may be an example of aspects of the transceiver 820 described with reference to FIG. 8. The receiver 610 may utilize a single antenna or a set of antennas.

The user terminal communications manager 615 may be an example of aspects of the user terminal communications manager 515 as described herein. The user terminal communications manager 615 may include an uplink format component 620, a mapping component 625, and a communications component 630. The user terminal communications manager 615 may be an example of aspects of the user terminal communications manager 810 described herein.

The uplink format component 620 may identify an uplink reference signal format for transmission of an uplink reference signal based on an indication received from the non-terrestrial network, where the uplink reference signal format includes a comb-based pattern of subcarriers within a first OFDM symbol and within a second OFDM symbol for transmission of the uplink reference signal. The mapping component 625 may map the uplink reference signal to a first set of subcarriers within the first OFDM symbol and to a second set of subcarriers within the second OFDM symbol in accordance with the comb-based pattern. The communications component 630 may transmit the uplink reference signal on the first set of subcarriers within the first OFDM symbol and on the second set of subcarriers within the second OFDM symbol, where the first OFDM symbol and the second OFDM symbol are transmitted coherently.

The transmitter 635 may transmit signals generated by other components of the device 605. In some examples, the transmitter 635 may be collocated with a receiver 610 in a transceiver component. For example, the transmitter 635 may be an example of aspects of the transceiver 820 described with reference to FIG. 8. The transmitter 635 may utilize a single antenna or a set of antennas.

Figure 7:
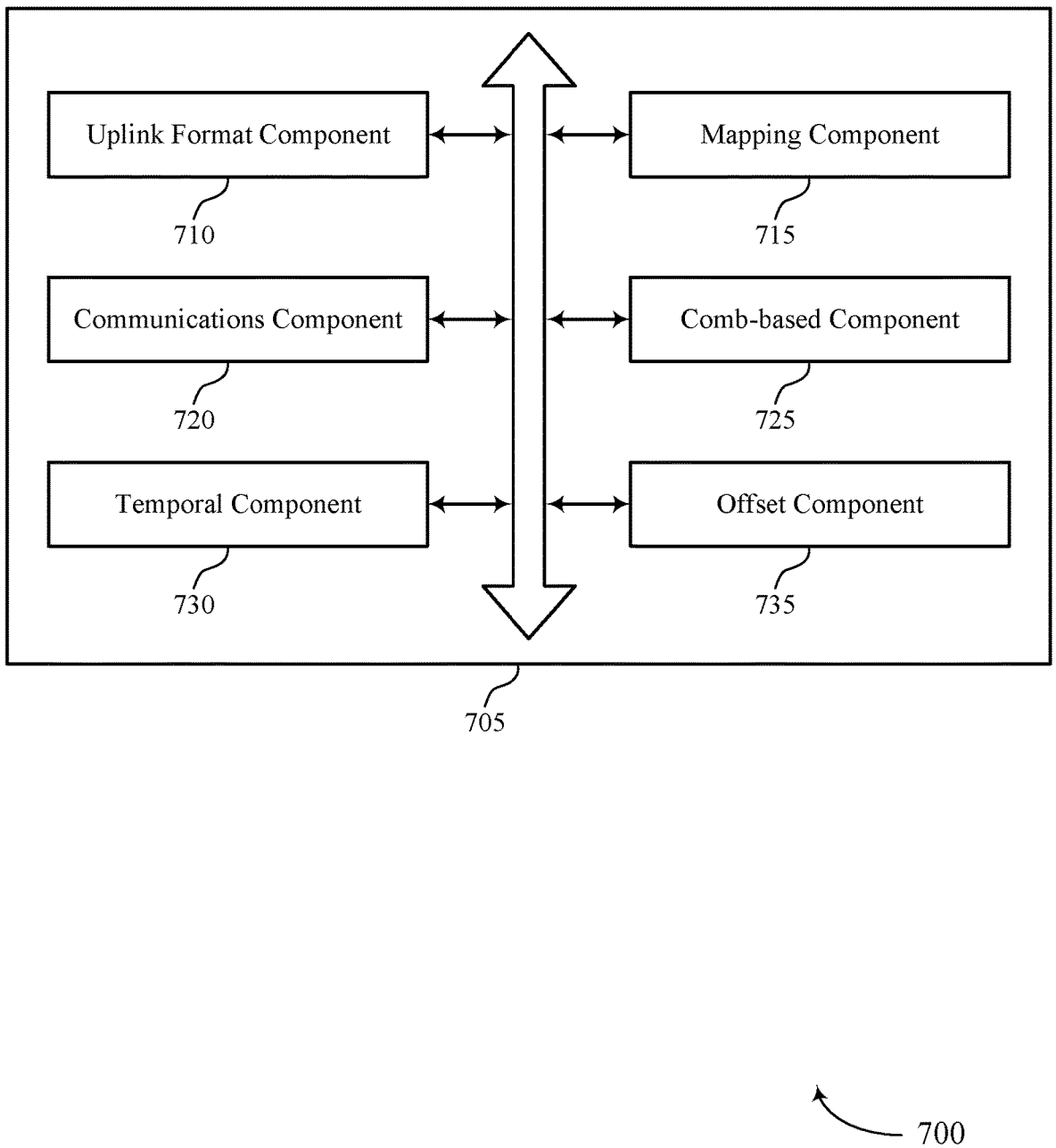
FIG. 7 shows a block diagram of a user terminal communications manager that supports uplink reference signal repetition for non-terrestrial networks in accordance with aspects of the present disclosure.

FIG. 7 shows a block diagram 700 of a user terminal communications manager 705 that supports uplink reference signal repetition for non-terrestrial networks in accordance with aspects of the present disclosure. The user terminal communications manager 705 may be an example of aspects of a user terminal communications manager 515, a user terminal communications manager 615, or a user terminal communications manager 810 described herein. The user terminal communications manager 705 may include an uplink format component 710, a mapping component 715, a communications component 720, a comb-based component 725, a temporal component 730, and an offset component 735. Each of these components may communicate, directly or indirectly, with one another (e.g., via one or more buses).

The uplink format component 710 may identify an uplink reference signal format for transmission of an uplink reference signal based on an indication received from the non-terrestrial network, where the uplink reference signal format includes a comb-based pattern of subcarriers within a first OFDM symbol and within a second OFDM symbol for transmission of the uplink reference signal. In some cases, the uplink reference signal includes a sounding reference signal. In some cases, the first OFDM symbol and the second OFDM symbol are consecutive. In some cases, the first OFDM symbol and the second OFDM symbol are non-consecutive. The mapping component 715 may map the uplink reference signal to a first set of subcarriers within the first OFDM symbol and to a second set of subcarriers within the second OFDM symbol in accordance with the comb-based pattern. In some examples, the mapping component 715 may map the uplink reference signal to a third set of subcarriers within a third OFDM symbol in accordance with the comb-based pattern.

The communications component 720 may transmit the uplink reference signal on the first set of subcarriers within the first OFDM symbol and on the second set of subcarriers within the second OFDM symbol, where the first OFDM symbol and the second OFDM symbol are transmitted coherently. In some examples, the communications component 720 may transmit the uplink reference signal on the third plurality of subcarriers within the third OFDM symbol, wherein the first OFDM symbol. The second OFDM symbol, and the third OFDM symbol may be transmitted coherently.

The comb-based component 725 may identify a comb-based pattern offset and a comb offset for one or more of the first OFDM symbol and the second OFDM symbol, where the comb-based pattern offset comprises an indication of subcarriers associated with one or more of the first OFDM symbol and the second OFDM symbol, and the comb offset indicating a first subcarrier of the subcarriers for one or more of the first OFDM symbol and the second OFDM symbol. In some examples, the comb-based component 725 may identify the comb offset of the first OFDM symbol, and apply the comb offset to one or more of the first OFDM symbol and the second OFDM symbol based at least in part on a pre-defined comb offset sequence pattern, where mapping the uplink reference signal to the first set of subcarriers within the first OFDM symbol and to the second set of subcarriers within the second OFDM symbol is further based on applying the comb offset sequentially to one or more of the first OFDM symbol and the second OFDM symbol. In some examples, the comb-based component 725 may identify a comb configuration for the uplink reference signal. In some examples, the comb-based component 725 may determine the comb-based pattern based on the comb level configuration. In some cases, the first OFDM symbol and the second OFDM symbol have different comb offsets. In some cases, the comb configuration includes a comb2 or a comb4. The temporal component 730 may identify a temporal gap configuration between the first OFDM symbol and the second OFDM symbol, where the temporal gap configuration is based on one or more of an accuracy level or a reference signal pulling range. The offset component 735 may correct one or more of a timing offset and a frequency offset based on feedback from non-terrestrial network.

Figure 8:
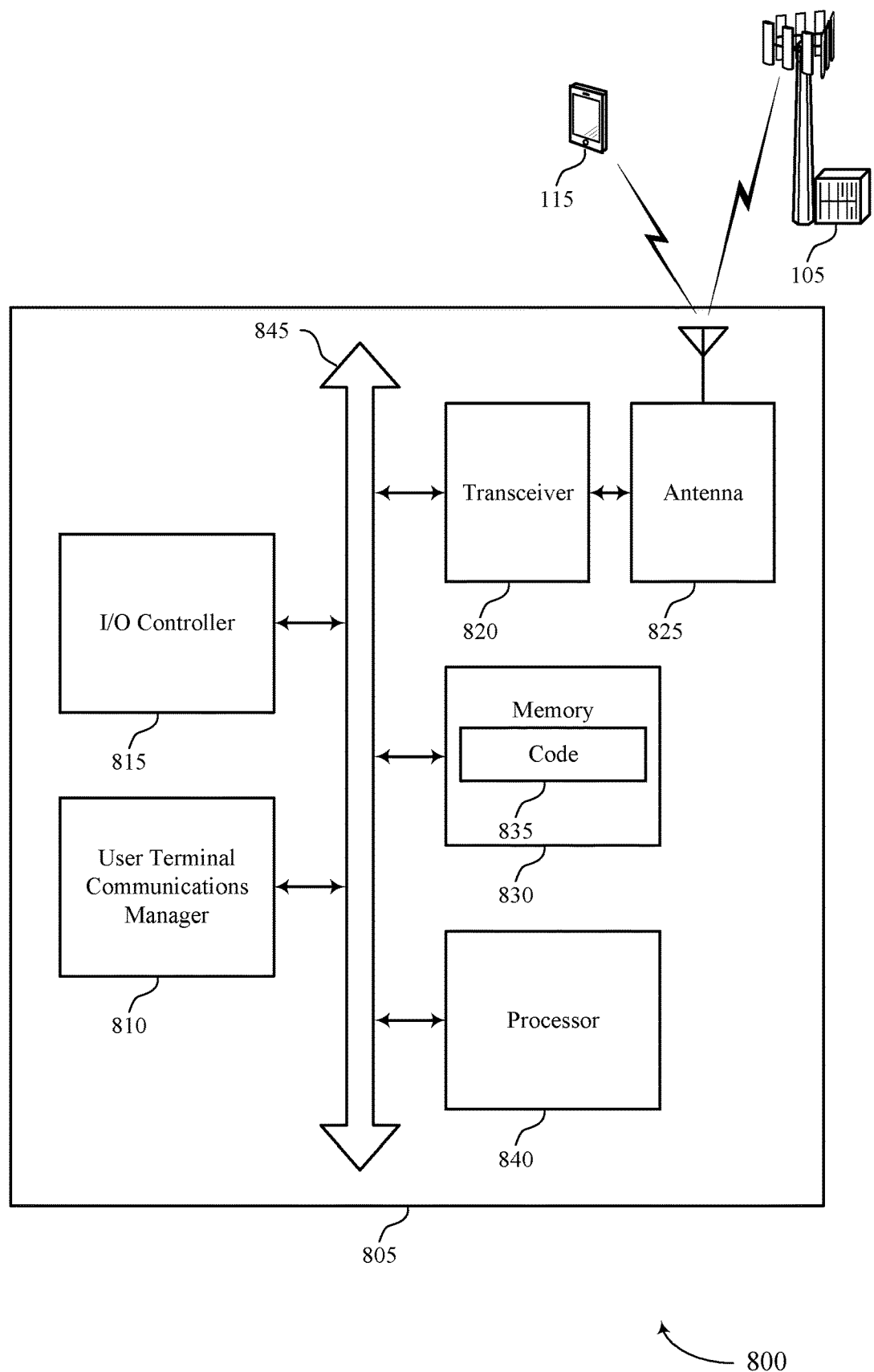
FIG. 8 shows a diagram of a system including a device that supports uplink reference signal repetition for non-terrestrial networks in accordance with aspects of the present disclosure.

FIG. 8 shows a diagram of a system 800 including a device 805 that supports uplink reference signal repetition for non-terrestrial networks in accordance with aspects of the present disclosure. The device 805 may be an example of or include the components of device 505, device 605, or a user terminal 115 as described herein. The device 805 may include components for bi-directional voice and data communications including components for transmitting and receiving communications, including a user terminal communications manager 810, an I/O controller 815, a transceiver 820, an antenna 825, memory 830, and a processor 840. These components may be in electronic communication via one or more buses (e.g., bus 845).

The actions performed by the user terminal communications manager 810 as described herein may be implemented to realize one or more potential advantages. For example, the user terminal communications manager 810 may identify an uplink reference signal format for transmission of an uplink reference signal based on an indication received from the non-terrestrial network. The uplink reference signal format includes a comb-based pattern of subcarriers within a first OFDM symbol and within a second OFDM symbol for transmission of the uplink reference signal. The user terminal communications manager 810 may map the uplink reference signal to a first set of subcarriers within the first OFDM symbol and to a second set of subcarriers within the second OFDM symbol in accordance with the comb-based pattern, and transmit the uplink reference signal on the first set of subcarriers within the first OFDM symbol and on the second set of subcarriers within the second OFDM symbol, where the first OFDM symbol and the second OFDM symbol are transmitted coherently. Based on implementing the mapping according to the comb-based pattern, one or more processors of the device 805 (for example, processor(s) controlling or incorporated with the user terminal communications manager 810) may promote power savings (e.g., increase a battery life of the device 805), and, in some examples, may promote higher reliability and lower latency operations related to uplink reference signal repetition for non-terrestrial networks.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS, ANDROID, MS-DOS, MS-WINDOWS, OS/2, UNIX, LINUX, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the device 805 may include a single antenna 825. However, in some cases, the device 805 may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor 840 to perform various functions described herein. In some cases, the memory 830 may contain, among other things, a BIOS which may control basic hardware or software operation such as the interaction with peripheral components or devices. The memory 830 may be coupled (e.g., operatively, communicatively, functionally, electronically, electrically) to the processor 840. The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink reference signal repetition for non-terrestrial networks).

Figure 9:
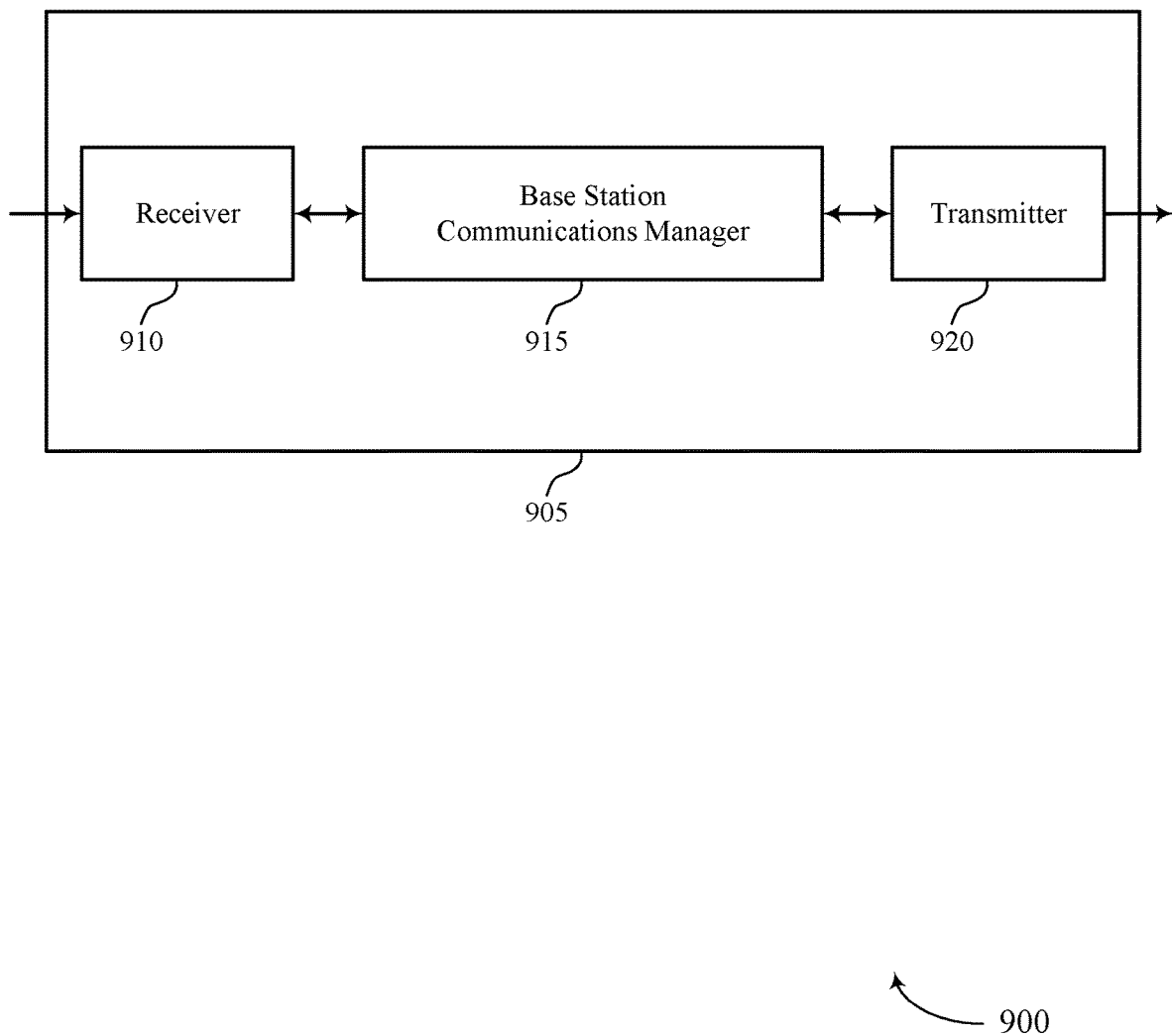
FIGS. 9 and 10 show block diagrams of devices that support uplink reference signal repetition for non-terrestrial networks in accordance with aspects of the present disclosure.

FIG. 9 shows a block diagram 900 of a device 905 that supports uplink reference signal repetition for non-terrestrial networks in accordance with aspects of the present disclosure. The device 905 may be an example of aspects of a base station 105 (also referred to as an access station) as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink reference signal repetition for non-terrestrial networks). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may determine an uplink reference signal format for an uplink reference signal to be transmitted from a user terminal in a non-terrestrial network, the uplink reference signal format including a comb-based pattern of subcarriers within a first OFDM symbol and within a second OFDM symbol, where the access station and the user terminal are in communication with each other via the non-terrestrial network and receive, from the user terminal, the uplink reference signal on the first set of subcarriers within the first OFDM symbol and on the second set of subcarriers within the second OFDM symbol, where the first OFDM symbol and the second OFDM symbol are transmitted coherently. The base station communications manager 915 may be an example of aspects of the base station communications manager 1210 described herein.

The base station communications manager 915, or its sub-components, may be implemented in hardware, software (e.g., executed by a processor), or any combination thereof. If implemented in code executed by a processor, the functions of the base station communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas.

Figure 10:
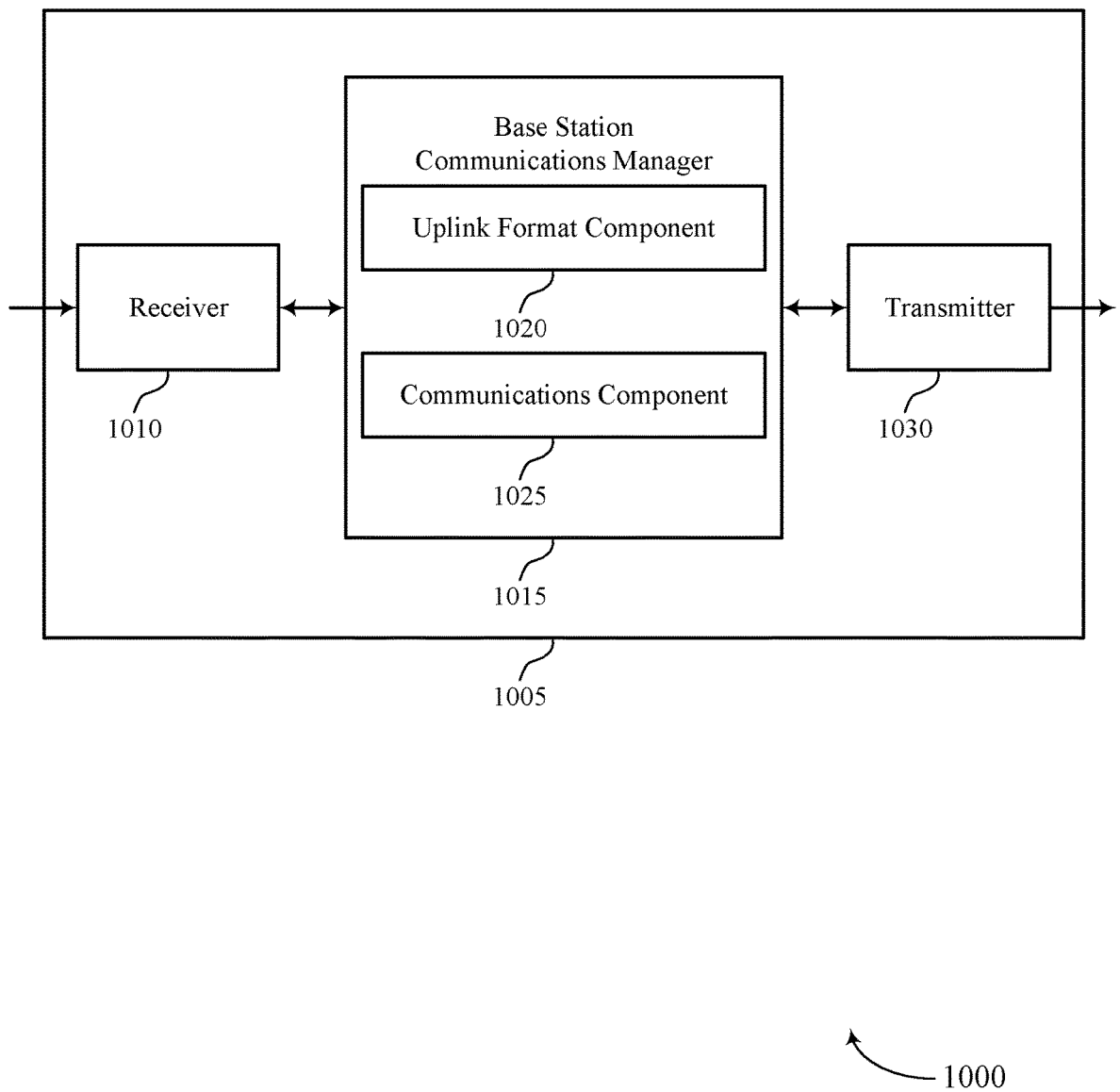

FIG. 10 shows a block diagram 1000 of a device 1005 that supports uplink reference signal repetition for non-terrestrial networks in accordance with aspects of the present disclosure. The device 1005 may be an example of aspects of a device 905, or a base station 105 (also referred to as an access station) as described herein. The device 1005 may include a receiver 1010, a base station communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink reference signal repetition for non-terrestrial networks). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include an uplink format component 1020 and a communications component 1025. The base station communications manager 1015 may be an example of aspects of the base station communications manager 1210 described herein.

The uplink format component 1020 may determine an uplink reference signal format for an uplink reference signal to be transmitted from a user terminal in a non-terrestrial network, the uplink reference signal format including a comb-based pattern of subcarriers within a first OFDM symbol and within a second OFDM symbol, where the access station and the user terminal are in communication with each other via the non-terrestrial network. The communications component 1025 may receive, from the user terminal, the uplink reference signal on the first set of subcarriers within the first OFDM symbol and on the second set of subcarriers within the second OFDM symbol, where the first OFDM symbol and the second OFDM symbol are transmitted coherently.

The transmitter 1030 may transmit signals generated by other components of the device 1005. In some examples, the transmitter 1030 may be collocated with a receiver 1010 in a transceiver component. For example, the transmitter 1030 may be an example of aspects of the transceiver 1220 described with reference to FIG. 12. The transmitter 1030 may utilize a single antenna or a set of antennas.

Figure 11:
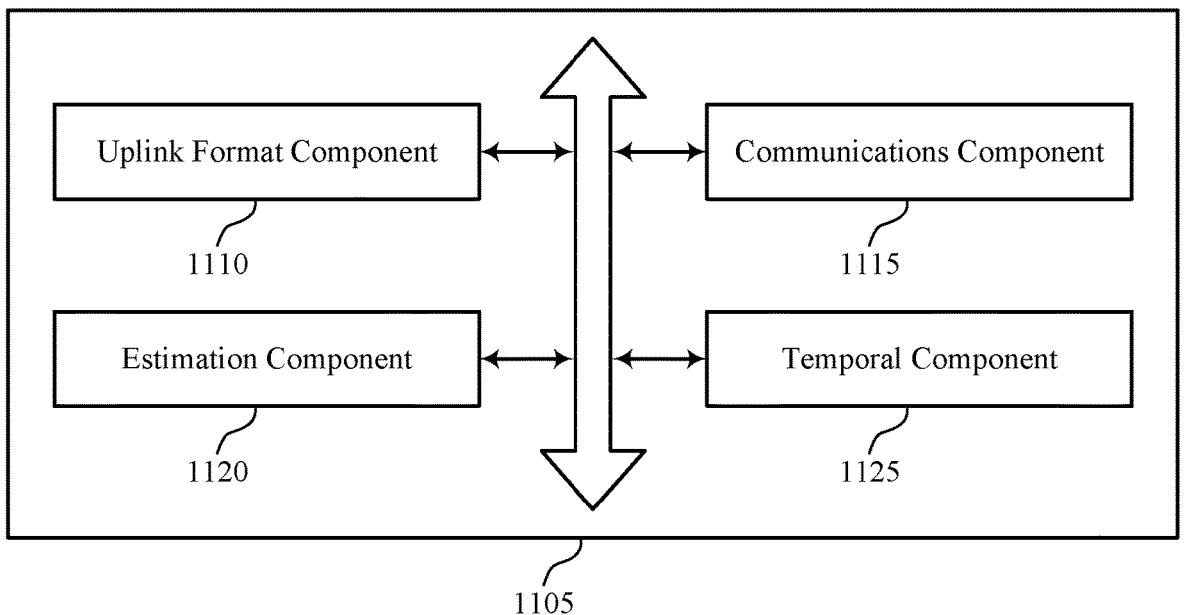
FIG. 11 shows a block diagram of a base station communications manager that supports uplink reference signal repetition for non-terrestrial networks in accordance with aspects of the present disclosure.

FIG. 11 shows a block diagram 1100 of a base station communications manager 1105 that supports uplink reference signal repetition for non-terrestrial networks in accordance with aspects of the present disclosure. The base station communications manager 1105 may be an example of aspects of a base station communications manager 915, a base station communications manager 1015, or a base station communications manager 1210 described herein. The base station communications manager 1105 may include an uplink format component 1110, a communications component 1115, an estimation component 1120, and a temporal component 1125. Each of these components may communicate, directly or indirectly, with one another (e.g., via one or more buses).

The uplink format component 1110 may determine an uplink reference signal format for an uplink reference signal to be transmitted from a user terminal in a non-terrestrial network, the uplink reference signal format including a comb-based pattern of subcarriers within a first OFDM symbol and within a second OFDM symbol, where the access station and the user terminal are in communication with each other via the non-terrestrial network. In some cases, the uplink reference signal includes a sounding reference signal. In some cases, the first OFDM symbol and the second OFDM symbol are consecutive. In some cases, the first OFDM symbol and the second OFDM symbol are non-consecutive.

The communications component 1115 may receive, from the user terminal, the uplink reference signal on the first set of subcarriers within the first OFDM symbol and on the second set of subcarriers within the second OFDM symbol, where the first OFDM symbol and the second OFDM symbol are transmitted coherently. In some examples, the communications component 1115 may receive the uplink reference signal on a third set of subcarriers within a third OFDM symbol, where the first OFDM symbol, the second OFDM symbol, and the third OFDM symbol are transmitted coherently. The estimation component 1120 may perform one or more of a timing estimation or a frequency estimation based on receiving the uplink reference signal on the first set of subcarriers within the first OFDM symbol and on the second set of subcarriers within the second OFDM symbol. The temporal component 1125 may determine a temporal gap configuration between the first OFDM symbol and the second OFDM symbol, where the temporal gap configuration is based on one or more of an accuracy level or a reference signal pulling range.

Figure 12:
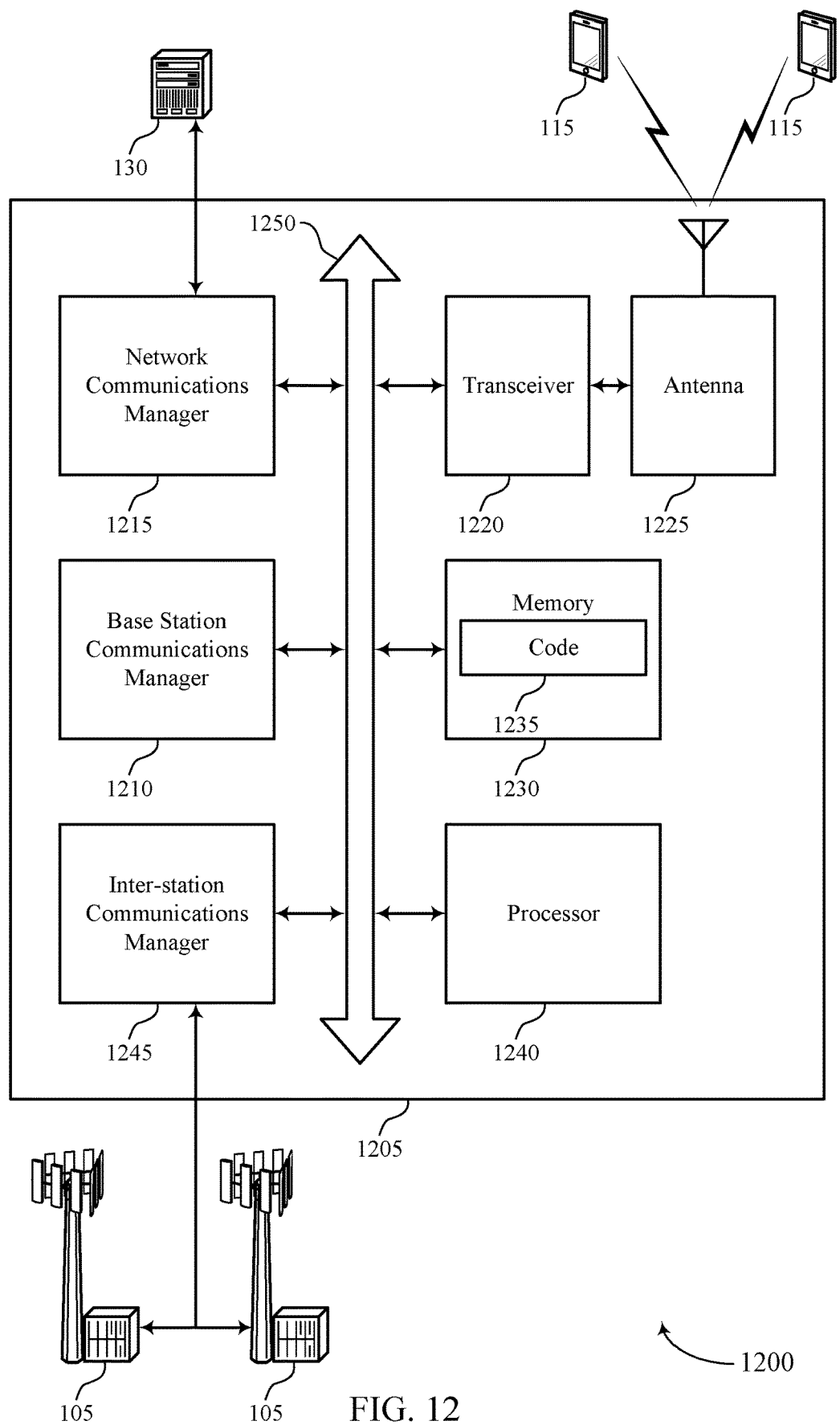
FIG. 12 shows a diagram of a system including a device that supports uplink reference signal repetition for non-terrestrial networks in accordance with aspects of the present disclosure.

FIG. 12 shows a diagram of a system 1200 including a device 1205 that supports uplink reference signal repetition for non-terrestrial networks in accordance with aspects of the present disclosure. The device 1205 may be an example of or include the components of device 905, device 1005, or a base station 105 (also referred to as an access station) as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may determine an uplink reference signal format for an uplink reference signal to be transmitted from a user terminal in a non-terrestrial network, the uplink reference signal format including a comb-based pattern of subcarriers within a first OFDM symbol and within a second OFDM symbol, where the access station and the user terminal are in communication with each other via the non-terrestrial network and receive, from the user terminal, the uplink reference signal on the first set of subcarriers within the first OFDM symbol and on the second set of subcarriers within the second OFDM symbol, where the first OFDM symbol and the second OFDM symbol are transmitted coherently. The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the device 1205 may include a single antenna 1225. However, in some cases the device 1205 may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices. The memory 1230 may be coupled (e.g., operatively, communicatively, functionally, electronically, electrically) to the processor 1240. The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting uplink reference signal repetition for non-terrestrial networks).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
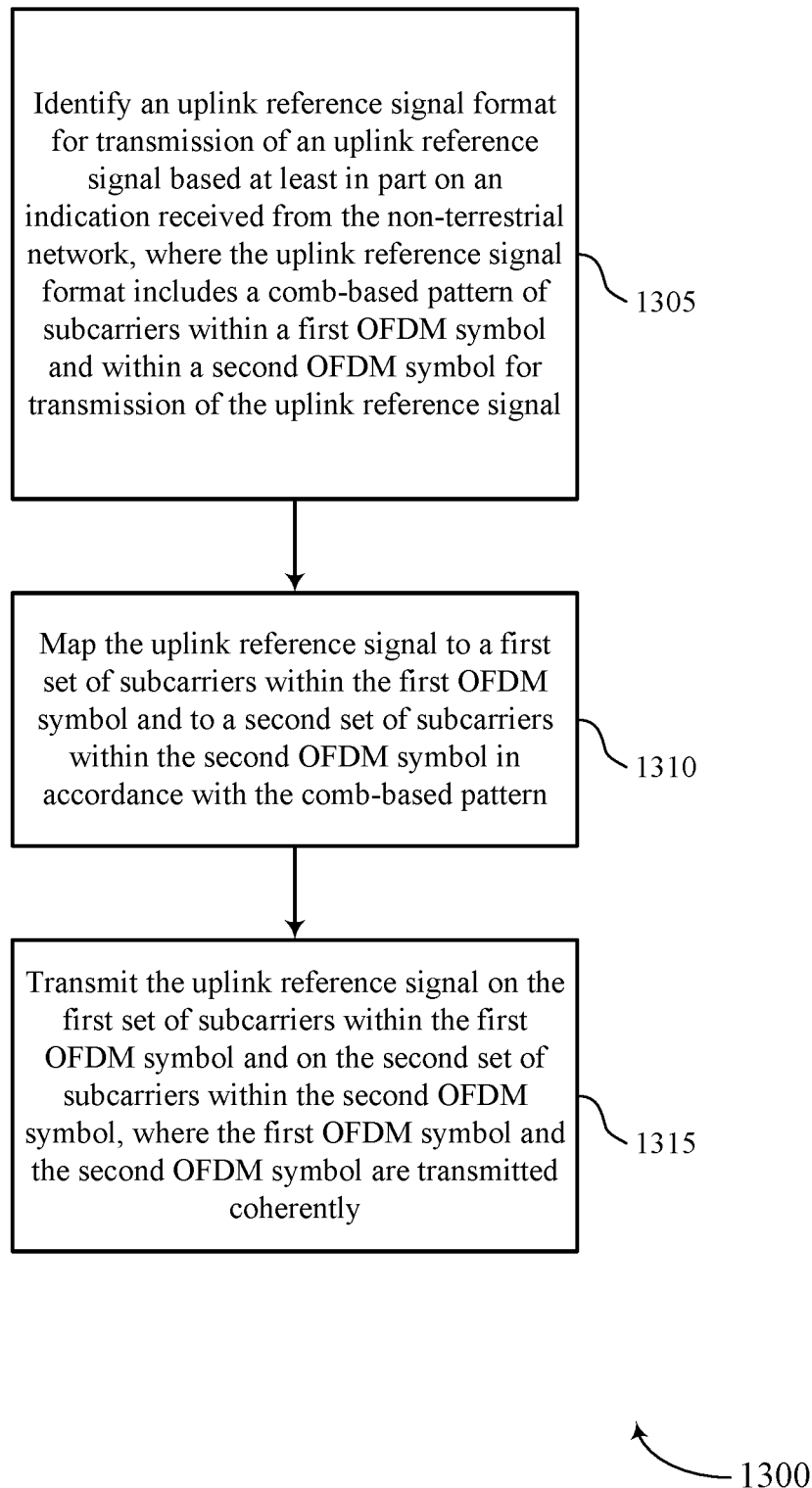
FIGS. 13 through 17 show flowcharts illustrating methods that support uplink reference signal repetition for non-terrestrial networks in accordance with aspects of the present disclosure.

FIG. 13 shows a flowchart illustrating a method 1300 that supports uplink reference signal repetition for non-terrestrial networks in accordance with aspects of the present disclosure. The operations of method 1300 may be implemented by a user terminal 115 or its components as described herein. For example, the operations of method 1300 may be performed by a user terminal communications manager as described with reference to FIGS. 5 through 8. In some examples, a user terminal may execute a set of instructions to control the functional elements of the user terminal to perform the functions described below. Additionally or alternatively, a user terminal may perform aspects of the functions described below using special-purpose hardware.

At 1305, the user terminal may identify an uplink reference signal format for transmission of an uplink reference signal based at least in part on an indication received from the non-terrestrial network, where the uplink reference signal format includes a comb-based pattern of subcarriers within a first OFDM symbol and within a second OFDM symbol for transmission of the uplink reference signal. The operations of 1305 may be performed according to the methods described herein. In some examples, aspects of the operations of 1305 may be performed by an uplink format component as described with reference to FIGS. 5 through 8.

At 1310, the user terminal may map the uplink reference signal to a first set of subcarriers within the first OFDM symbol and to a second set of subcarriers within the second OFDM symbol in accordance with the comb-based pattern. The operations of 1310 may be performed according to the methods described herein. In some examples, aspects of the operations of 1310 may be performed by a mapping component as described with reference to FIGS. 5 through 8.

At 1315, the user terminal may transmit the uplink reference signal on the first set of subcarriers within the first OFDM symbol and on the second set of subcarriers within the second OFDM symbol, where the first OFDM symbol and the second OFDM symbol are transmitted coherently. The operations of 1315 may be performed according to the methods described herein. In some examples, aspects of the operations of 1315 may be performed by a communications component as described with reference to FIGS. 5 through 8.

Figure 14:
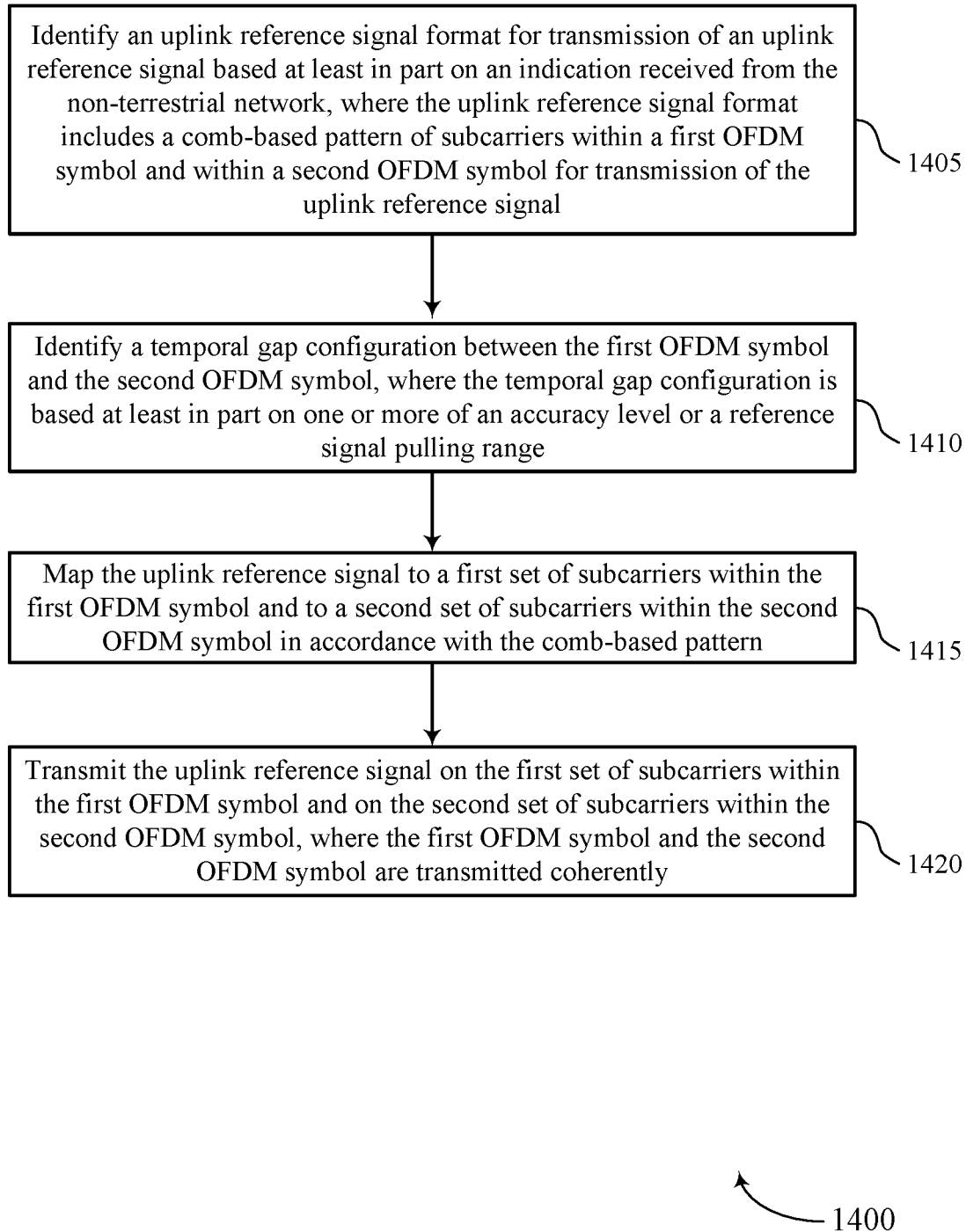

FIG. 14 shows a flowchart illustrating a method 1400 that supports uplink reference signal repetition for non-terrestrial networks in accordance with aspects of the present disclosure. The operations of method 1400 may be implemented by a user terminal 115 or its components as described herein. For example, the operations of method 1400 may be performed by a user terminal communications manager as described with reference to FIGS. 5 through 8. In some examples, a user terminal may execute a set of instructions to control the functional elements of the user terminal to perform the functions described below. Additionally or alternatively, a user terminal may perform aspects of the functions described below using special-purpose hardware.

At 1405, the user terminal may identify an uplink reference signal format for transmission of an uplink reference signal based at least in part on an indication received from the non-terrestrial network, where the uplink reference signal format includes a comb-based pattern of subcarriers within a first OFDM symbol and within a second OFDM symbol for transmission of the uplink reference signal. The operations of 1405 may be performed according to the methods described herein. In some examples, aspects of the operations of 1405 may be performed by an uplink format component as described with reference to FIGS. 5 through 8.

At 1410, the user terminal may identify a temporal gap configuration between the first OFDM symbol and the second OFDM symbol, where the temporal gap configuration is based at least in part on one or more of an accuracy level or a reference signal pulling range. The operations of 1410 may be performed according to the methods described herein. In some examples, aspects of the operations of 1410 may be performed by a temporal component as described with reference to FIGS. 5 through 8.

At 1415, the user terminal may map the uplink reference signal to a first set of subcarriers within the first OFDM symbol and to a second set of subcarriers within the second OFDM symbol in accordance with the comb-based pattern. The operations of 1415 may be performed according to the methods described herein. In some examples, aspects of the operations of 1415 may be performed by a mapping component as described with reference to FIGS. 5 through 8.

At 1420, the user terminal may transmit the uplink reference signal on the first set of subcarriers within the first OFDM symbol and on the second set of subcarriers within the second OFDM symbol, where the first OFDM symbol and the second OFDM symbol are transmitted coherently. The operations of 1420 may be performed according to the methods described herein. In some examples, aspects of the operations of 1420 may be performed by a communications component as described with reference to FIGS. 5 through 8.

Figure 15:
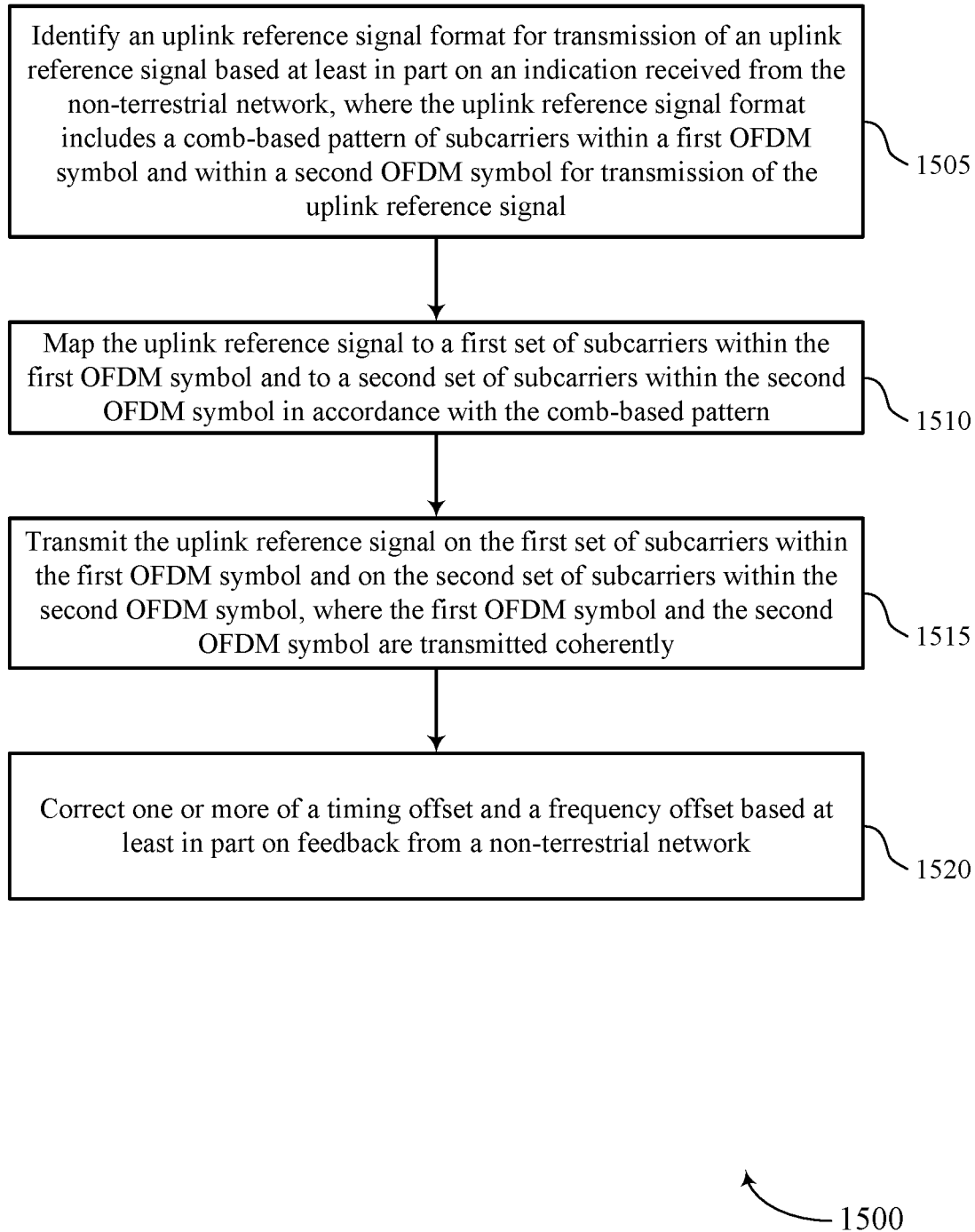

FIG. 15 shows a flowchart illustrating a method 1500 that supports uplink reference signal repetition for non-terrestrial networks in accordance with aspects of the present disclosure. The operations of method 1500 may be implemented by a user terminal 115 or its components as described herein. For example, the operations of method 1500 may be performed by a user terminal communications manager as described with reference to FIGS. 5 through 8. In some examples, a user terminal may execute a set of instructions to control the functional elements of the user terminal to perform the functions described below. Additionally or alternatively, a user terminal may perform aspects of the functions described below using special-purpose hardware.

At 1505, the user terminal may identify an uplink reference signal format for transmission of an uplink reference signal based at least in part on an indication received from the non-terrestrial network, where the uplink reference signal format includes a comb-based pattern of subcarriers within a first OFDM symbol and within a second OFDM symbol for transmission of the uplink reference signal. The operations of 1505 may be performed according to the methods described herein. In some examples, aspects of the operations of 1505 may be performed by an uplink format component as described with reference to FIGS. 5 through 8.

At 1510, the user terminal may map the uplink reference signal to a first set of subcarriers within the first OFDM symbol and to a second set of subcarriers within the second OFDM symbol in accordance with the comb-based pattern. The operations of 1510 may be performed according to the methods described herein. In some examples, aspects of the operations of 1510 may be performed by a mapping component as described with reference to FIGS. 5 through 8.

At 1515, the user terminal may transmit the uplink reference signal on the first set of subcarriers within the first OFDM symbol and on the second set of subcarriers within the second OFDM symbol, where the first OFDM symbol and the second OFDM symbol are transmitted coherently. The operations of 1515 may be performed according to the methods described herein. In some examples, aspects of the operations of 1515 may be performed by a communications component as described with reference to FIGS. 5 through 8.

At 1520, the user terminal may correct one or more of a timing offset and a frequency offset based at least in part on feedback from a non-terrestrial network. The operations of 1520 may be performed according to the methods described herein. In some examples, aspects of the operations of 1520 may be performed by an offset component as described with reference to FIGS. 5 through 8.

Figure 16:
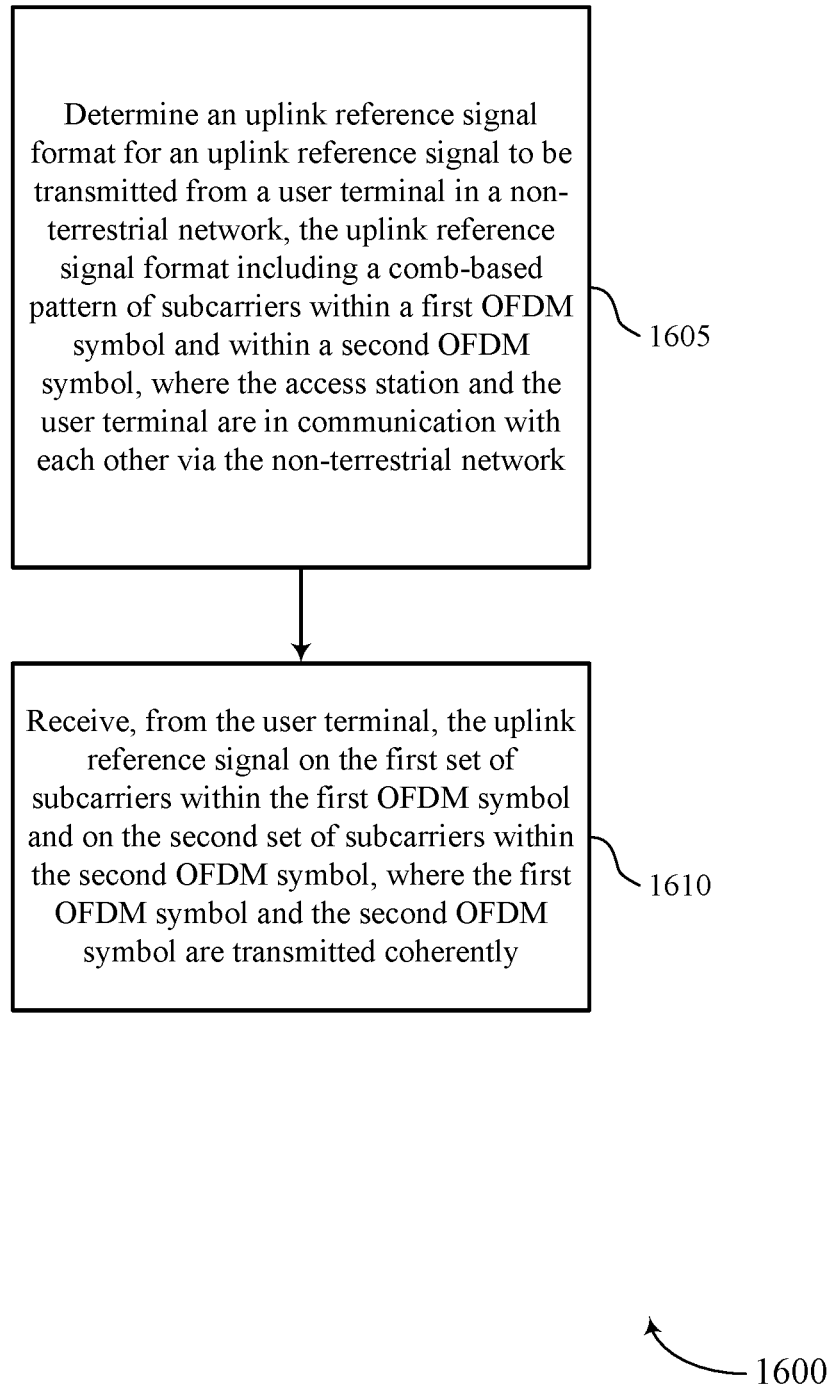

FIG. 16 shows a flowchart illustrating a method 1600 that supports uplink reference signal repetition for non-terrestrial networks in accordance with aspects of the present disclosure. The operations of method 1600 may be implemented by a base station 105 (also referred to as an access station) or its components as described herein. For example, the operations of method 1600 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may determine an uplink reference signal format for an uplink reference signal to be transmitted from a user terminal in a non-terrestrial network, the uplink reference signal format including a comb-based pattern of subcarriers within a first OFDM symbol and within a second OFDM symbol, where the access station and the user terminal are in communication with each other via the non-terrestrial network. The operations of 1605 may be performed according to the methods described herein. In some examples, aspects of the operations of 1605 may be performed by an uplink format component as described with reference to FIGS. 9 through 12.

At 1610, the base station may receive, from the user terminal, the uplink reference signal on the first set of subcarriers within the first OFDM symbol and on the second set of subcarriers within the second OFDM symbol, where the first OFDM symbol and the second OFDM symbol are transmitted coherently. The operations of 1610 may be performed according to the methods described herein. In some examples, aspects of the operations of 1610 may be performed by a communications component as described with reference to FIGS. 9 through 12.

Figure 17:
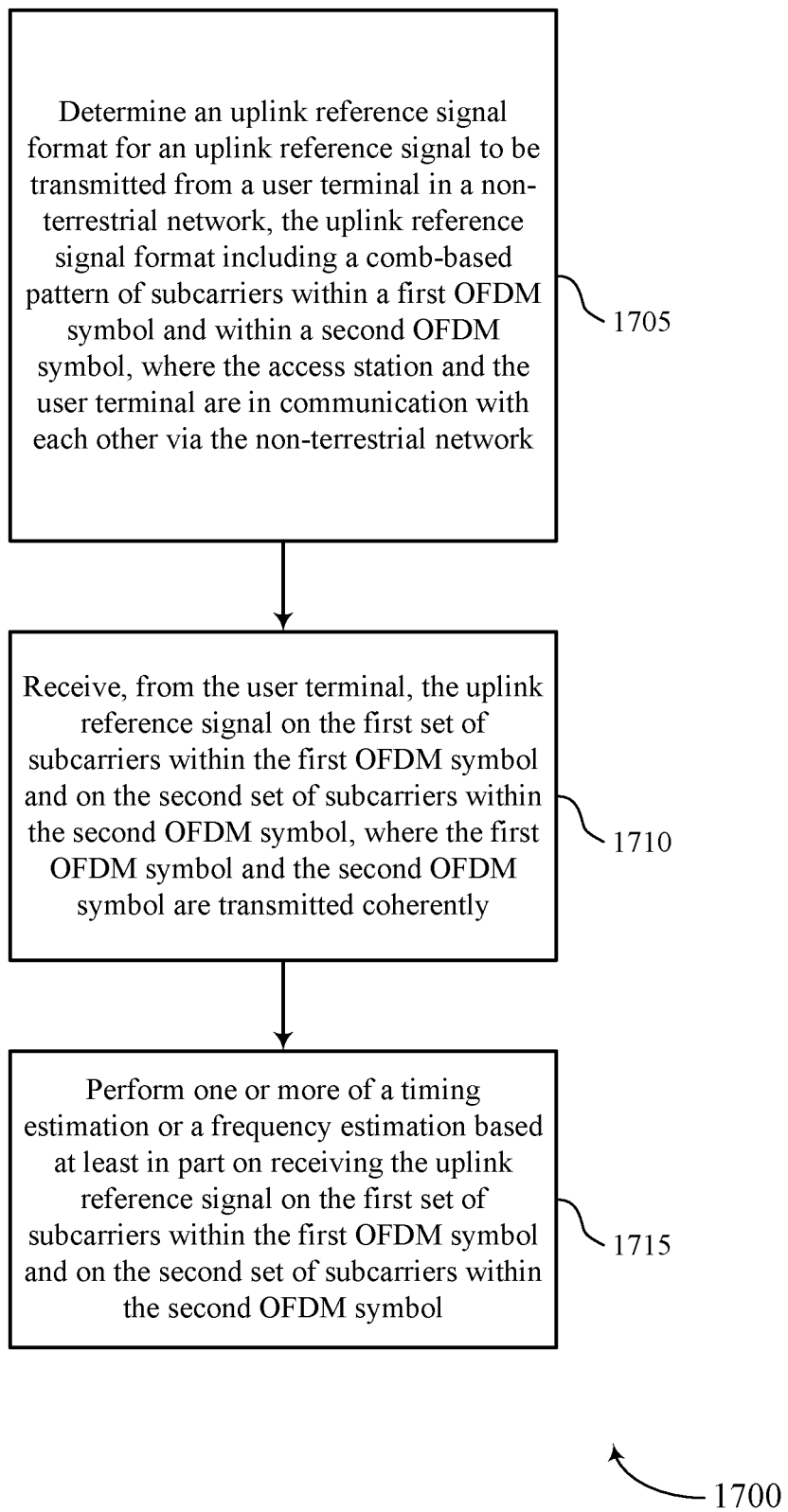

FIG. 17 shows a flowchart illustrating a method 1700 that supports uplink reference signal repetition for non-terrestrial networks in accordance with aspects of the present disclosure. The operations of method 1700 may be implemented by a base station 105 (also referred to as an access station) or its components as described herein. For example, the operations of method 1700 may be performed by a base station communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may determine an uplink reference signal format for an uplink reference signal to be transmitted from a user terminal in a non-terrestrial network, the uplink reference signal format including a comb-based pattern of subcarriers within a first OFDM symbol and within a second OFDM symbol, where the access station and the user terminal are in communication with each other via the non-terrestrial network. The operations of 1705 may be performed according to the methods described herein. In some examples, aspects of the operations of 1705 may be performed by an uplink format component as described with reference to FIGS. 9 through 12.

At 1710, the base station may receive, from the user terminal, the uplink reference signal on the first set of subcarriers within the first OFDM symbol and on the second set of subcarriers within the second OFDM symbol, where the first OFDM symbol and the second OFDM symbol are transmitted coherently. The operations of 1710 may be performed according to the methods described herein. In some examples, aspects of the operations of 1710 may be performed by a communications component as described with reference to FIGS. 9 through 12.

At 1715, the base station may perform one or more of a timing estimation or a frequency estimation based at least in part on receiving the uplink reference signal on the first set of subcarriers within the first OFDM symbol and on the second set of subcarriers within the second OFDM symbol. The operations of 1715 may be performed according to the methods described herein. In some examples, aspects of the operations of 1715 may be performed by an estimation component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a user terminal in a non-terrestrial network, comprising: identifying an uplink reference signal format for transmission of an uplink reference signal based at least in part on an indication received from the non-terrestrial network, wherein the uplink reference signal format includes a comb-based pattern of subcarriers within a first orthogonal frequency-division multiplexing (OFDM) symbol and within a second OFDM symbol for transmission of the uplink reference signal; mapping the uplink reference signal to a first plurality of subcarriers within the first OFDM symbol and to a second plurality of subcarriers within the second OFDM symbol in accordance with the comb-based pattern; and transmitting the uplink reference signal on the first plurality of subcarriers within the first OFDM symbol and on the second plurality of subcarriers within the second OFDM symbol, wherein the first OFDM symbol and the second OFDM symbol are transmitted coherently.

Aspect 2: The method of aspect 1, wherein identifying the uplink reference signal format comprises: identifying a comb-based pattern offset and a comb offset for one or more of the first OFDM symbol and the second OFDM symbol, wherein the comb-based pattern offset comprises an indication of subcarriers associated with one or more of the first OFDM symbol and the second OFDM symbol, and the comb offset indicating a first subcarrier of the subcarriers for one or more of the first OFDM symbol and the second OFDM symbol.

Aspect 3: The method of aspect 2, wherein the first OFDM symbol and the second OFDM symbol have different comb offsets.

Aspect 4: The method of any of aspects 2 through 3, further comprising: identifying the comb offset of the first OFDM symbol; and applying the comb offset to one or more of the first OFDM symbol and the second OFDM symbol based at least in part on a pre-defined comb offset sequence pattern, wherein mapping the uplink reference signal to the first plurality of subcarriers within the first OFDM symbol and to the second plurality of subcarriers within the second OFDM symbol is further based at least in part on applying the comb offset sequentially to one or more of the first OFDM symbol and the second OFDM symbol.

Aspect 5: The method of any of aspects 1 through 4, wherein identifying the uplink reference signal format comprises: identifying a comb configuration for the uplink reference signal; and determining the comb-based pattern based at least in part on the comb level configuration, wherein the comb configuration comprises a comb 2 (comb2) or a comb 4 (comb4).

Aspect 6: The method of any of aspects 1 through 5, wherein identifying the uplink reference signal format comprises: identifying a temporal gap configuration between the first OFDM symbol and the second OFDM symbol, wherein the temporal gap configuration is based at least in part on one or more of an accuracy level or a reference signal pulling range.

Aspect 7: The method of any of aspects 1 through 6, further comprising: correcting one or more of a timing offset and a frequency offset based at least in part on feedback from the non-terrestrial network.

Aspect 8: The method of any of aspects 1 through 7, wherein the uplink reference signal comprises a sounding reference signal.

Aspect 9: The method of any of aspects 1 through 8, further comprising: mapping the uplink reference signal to a third plurality of subcarriers within a third OFDM symbol in accordance with the comb-based pattern, wherein transmitting the uplink reference signal on the first plurality of subcarriers within the first OFDM symbol and on the second plurality of subcarriers within the second OFDM symbol further comprises: transmitting the uplink reference signal on the third plurality of subcarriers within the third OFDM symbol, wherein the first OFDM symbol, the second OFDM symbol, and the third OFDM symbol are transmitted coherently.

Aspect 10: The method of any of aspects 1 through 9, wherein the first OFDM symbol and the second OFDM symbol are consecutive.

Aspect 11: The method of any of aspects 1 through 10, wherein the first OFDM symbol and the second OFDM symbol are non-consecutive.

Aspect 12: A method for wireless communication at an access station, comprising: determining an uplink reference signal format for an uplink reference signal to be transmitted from a user terminal in a non-terrestrial network, the uplink reference signal format including a comb-based pattern of subcarriers within a first orthogonal frequency-division multiplexing (OFDM) symbol and within a second OFDM symbol, wherein the access station and the user terminal are in communication with each other via the non-terrestrial network; and receiving, from the user terminal, the uplink reference signal on the first plurality of subcarriers within the first OFDM symbol and on the second plurality of subcarriers within the second OFDM symbol, wherein the first OFDM symbol and the second OFDM symbol are transmitted coherently.

Aspect 13: The method of aspect 12, further comprising: performing one or more of a timing estimation or a frequency estimation based at least in part on receiving the uplink reference signal on the first plurality of subcarriers within the first OFDM symbol and on the second plurality of subcarriers within the second OFDM symbol.

Aspect 14: The method of any of aspects 12 through 13, wherein determining the uplink reference signal format comprises: determining a temporal gap configuration between the first OFDM symbol and the second OFDM symbol, wherein the temporal gap configuration is based at least in part on one or more of an accuracy level or a reference signal pulling range.

Aspect 15: The method of any of aspects 12 through 14, wherein the uplink reference signal comprises a sounding reference signal.

Aspect 16: The method of any of aspects 12 through 15, wherein receiving, from the user terminal, the uplink reference signal on the first plurality of subcarriers within the first OFDM symbol and on the second plurality of subcarriers within the second OFDM symbol further comprises: receiving the uplink reference signal on a third plurality of subcarriers within a third OFDM symbol, wherein the first OFDM symbol, the second OFDM symbol, and the third OFDM symbol are transmitted coherently.

Aspect 17: The method of any of aspects 12 through 16, wherein the first OFDM symbol and the second OFDM symbol are consecutive.

Aspect 18: The method of any of aspects 12 through 17, wherein the first OFDM symbol and the second OFDM symbol are non-consecutive.

Aspect 19: An apparatus for wireless communication at a user terminal in a non-terrestrial network, comprising at least one processor; memory coupled with the at least one processor; and instructions stored in the memory and executable by the at least one processor to cause the apparatus to perform a method of any of aspects 1 through 11.

Aspect 20: An apparatus for wireless communication at a user terminal in a non-terrestrial network, comprising at least one means for performing a method of any of aspects 1 through 11.

Aspect 21: A non-transitory computer-readable medium storing code for wireless communication at a user terminal in a non-terrestrial network, the code comprising instructions executable by at least one processor to perform a method of any of aspects 1 through 11.

Aspect 22: An apparatus for wireless communication at an access station, comprising at least one processor; memory coupled with the at least one processor; and instructions stored in the memory and executable by the at least one processor to cause the apparatus to perform a method of any of aspects 12 through 18.

Aspect 23: An apparatus for wireless communication at an access station, comprising at least one means for performing a method of any of aspects 12 through 18.

Aspect 24: A non-transitory computer-readable medium storing code for wireless communication at an access station, the code comprising instructions executable by at least one processor to perform a method of any of aspects 12 through 18.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), CDMA2000 covers IS-2000, IS-95, and IS-856 standards. IS-2000 Releases may be commonly referred to as CDMA2000 1x, 1x, IS-856 (TIA-856) is commonly referred to as CDMA2000 1xEV-DO, High Rate Packet Data (HRPD). UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies, including future systems and radio technologies, not explicitly mentioned herein. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, phase change memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user terminal in a non-terrestrial network, comprising:
receiving, via the non-terrestrial network, radio resource control signaling indicating an uplink reference signal format;
identifying the uplink reference signal format, for a coherent transmission of an uplink reference signal, based at least in part on the radio resource control signaling from the non-terrestrial network, wherein the uplink reference signal format includes a comb-based pattern of subcarriers within a first orthogonal frequency-division multiplexing (OFDM) symbol having a first comb offset and within a second OFDM symbol having a second comb offset that is different from the first comb offset for transmission of the uplink reference signal, and wherein the uplink reference signal format configures a temporal gap, between the first OFDM symbol having the first comb offset and the second OFDM symbol having the second comb offset, that does not include the comb-based pattern;
mapping the uplink reference signal to a first plurality of subcarriers within the first OFDM symbol according to the first comb offset and to a second plurality of subcarriers within the second OFDM symbol according to the second comb offset in accordance with the comb-based pattern; and
transmitting the coherent transmission of the uplink reference signal on the first plurality of subcarriers within the first OFDM symbol and on the second plurality of subcarriers within the second OFDM symbol, wherein the first OFDM symbol and the second OFDM symbol are transmitted coherently.

2. The method of claim 1, wherein identifying the uplink reference signal format comprises:
identifying a comb-based pattern offset and a respective comb offset for one or more of the first OFDM symbol and the second OFDM symbol, wherein the comb-based pattern offset comprises an indication of subcarriers associated with one or more of the first OFDM symbol and the second OFDM symbol, and the respective comb offset indicating a first subcarrier of the subcarriers for one or more of the first OFDM symbol and the second OFDM symbol.

3. The method of claim 2, further comprising:
applying the first comb offset to the first OFDM symbol based at least in part on a pre-defined comb offset sequence pattern; and
applying the second comb offset to the second OFDM symbol based at least in part on the pre-defined comb offset sequence pattern.

4. The method of claim 1, wherein identifying the uplink reference signal format comprises:
identifying a comb configuration for the uplink reference signal; and
determining the comb-based pattern based at least in part on the comb configuration, wherein the comb configuration comprises a comb 2 (comb2) or a comb 4 (comb4).

5. The method of claim 1, wherein identifying the uplink reference signal format comprises:
identifying the temporal gap between the first OFDM symbol and the second OFDM symbol, wherein the temporal gap is based at least in part on an accuracy level.

6. The method of claim 1, further comprising:
correcting one or more of a timing offset and a frequency offset based at least in part on feedback from the non-terrestrial network.

7. The method of claim 1, wherein the uplink reference signal comprises a sounding reference signal.

8. The method of claim 1, further comprising:
mapping the uplink reference signal to a third plurality of subcarriers within a third OFDM symbol in accordance with the comb-based pattern, wherein transmitting the coherent transmission of the uplink reference signal on the first plurality of subcarriers within the first OFDM symbol and on the second plurality of subcarriers within the second OFDM symbol further comprises:
transmitting the coherent transmission of the uplink reference signal on the third plurality of subcarriers within the third OFDM symbol, wherein the first OFDM symbol, the second OFDM symbol, and the third OFDM symbol are transmitted coherently.

9. The method of claim 1, wherein the first OFDM symbol and the second OFDM symbol are consecutive.

10. The method of claim 1, wherein the first OFDM symbol and the second OFDM symbol are non-consecutive.

11. A method for wireless communication at an access station, comprising:
determining an uplink reference signal format for a coherent transmission of an uplink reference signal, the uplink reference signal format including a comb-based pattern of subcarriers within a first orthogonal frequency-division multiplexing (OFDM) symbol having a first comb offset and within a second OFDM symbol having a second comb offset, and the uplink reference signal format configuring a temporal gap, between the first OFDM symbol having the first comb offset and the second OFDM symbol having the second comb offset, that does not include the comb-based pattern;
transmitting, to a user terminal in a non-terrestrial network, radio resource control signaling indicating the uplink reference signal format; and
receiving, from the user terminal in the non-terrestrial network, the coherent transmission of the uplink reference signal on a first plurality of subcarriers within the first OFDM symbol and on a second plurality of subcarriers within the second OFDM symbol.

12. The method of claim 11, further comprising:
performing one or more of a timing estimation or a frequency estimation based at least in part on receiving the coherent transmission of the uplink reference signal on the first plurality of subcarriers within the first OFDM symbol and on the second plurality of subcarriers within the second OFDM symbol.

13. The method of claim 11, wherein determining the uplink reference signal format comprises:
determining the temporal gap between the first OFDM symbol and the second OFDM symbol, wherein the temporal gap is based at least in part on an accuracy level.

14. The method of claim 11, wherein the uplink reference signal comprises a sounding reference signal.

15. The method of claim 11, wherein receiving, from the user terminal in the non-terrestrial network, the coherent transmission of the uplink reference signal on the first plurality of subcarriers within the first OFDM symbol and on the second plurality of subcarriers within the second OFDM symbol further comprises:
receiving the coherent transmission of the uplink reference signal on a third plurality of subcarriers within a third OFDM symbol.

16. The method of claim 11, wherein the first OFDM symbol and the second OFDM symbol are consecutive.

17. The method of claim 11, wherein the first OFDM symbol and the second OFDM symbol are non-consecutive.

18. An apparatus for wireless communication in a non-terrestrial network, comprising:
at least one processor;
memory coupled to the at least one processor; and
instructions stored in the memory and executable by the processor to cause the apparatus to:
receive, via the non-terrestrial network, radio resource control signaling indicating an uplink reference signal format;
identify an uplink reference signal format, for a coherent transmission of an uplink reference signal, based at least in part on the radio resource control signaling from the non-terrestrial network, wherein the uplink reference signal format includes a comb-based pattern of subcarriers within a first orthogonal frequency-division multiplexing (OFDM) symbol having a first comb offset and within a second OFDM symbol having a second comb offset that is different from the first comb offset for transmission of the uplink reference signal, and wherein the uplink reference signal format configures a temporal gap, between the first OFDM symbol having the first comb offset and the second OFDM symbol having the second comb offset, that does not include the comb-based pattern;
map the uplink reference signal to a first plurality of subcarriers within the first OFDM symbol according to the first comb offset and to a second plurality of subcarriers within the second OFDM symbol according to the second comb offset in accordance with the comb-based pattern; and
transmit the coherent transmission of the uplink reference signal on the first plurality of subcarriers within the first OFDM symbol and on the second plurality of subcarriers within the second OFDM symbol, wherein the first OFDM symbol and the second OFDM symbol are transmitted coherently.

19. The apparatus of claim 18, wherein the instructions to identify the uplink reference signal format are executable by the processor to cause the apparatus to:
identify a comb-based pattern offset and a respective comb offset for one or more of the first OFDM symbol and the second OFDM symbol, wherein the comb-based pattern offset comprises an indication of subcarriers associated with one or more of the first OFDM symbol and the second OFDM symbol, and the respective comb offset indicating a first subcarrier of the subcarriers for one or more of the first OFDM symbol and the second OFDM symbol.

20. The apparatus of claim 19, wherein the instructions are further executable by the processor to cause the apparatus to:
apply the first comb offset to the first OFDM symbol based at least in part on a pre-defined comb offset sequence pattern; and
applying the second comb offset to the second OFDM symbol based at least in part on the pre-defined comb offset sequence pattern.

21. The apparatus of claim 18, wherein the instructions to identify the uplink reference signal format are executable by the processor to cause the apparatus to:
identify a comb configuration for the uplink reference signal; and
determine the comb-based pattern based at least in part on the comb configuration, wherein the comb configuration comprises a comb 2 (comb2) or a comb 4 (comb4).

22. The apparatus of claim 18, wherein the instructions to identify the uplink reference signal format are executable by the processor to cause the apparatus to:
identify the temporal gap between the first OFDM symbol and the second OFDM symbol, wherein the temporal gap is based at least in part on an accuracy level.

23. The apparatus of claim 18, wherein the instructions are further executable by the processor to cause the apparatus to:
correct one or more of a timing offset and a frequency offset based at least in part on feedback from the non-terrestrial network.

24. The apparatus of claim 18, wherein the uplink reference signal comprises a sounding reference signal.

25. The apparatus of claim 18, wherein the instructions are further executable by the processor to cause the apparatus to:
map the uplink reference signal to a third plurality of subcarriers within a third OFDM symbol in accordance with the comb-based pattern, wherein the instructions to transmit the coherent transmission of the uplink reference signal on the first plurality of subcarriers within the first OFDM symbol and on the second plurality of subcarriers within the second OFDM symbol are further executable by the processor to cause the apparatus to:
transmit the coherent transmission of the uplink reference signal on the third plurality of subcarriers within the third OFDM symbol, wherein the first OFDM symbol, the second OFDM symbol, and the third OFDM symbol are transmitted coherently.

26. The apparatus of claim 18, wherein the first OFDM symbol and the second OFDM symbol are consecutive.

27. The apparatus of claim 18, wherein the first OFDM symbol and the second OFDM symbol are non-consecutive.

28. An apparatus for wireless communication, comprising:
at least one processor;
memory coupled to the at least one processor; and
instructions stored in the memory and executable by the processor to cause the apparatus to:
determine an uplink reference signal format for a coherent transmission of an uplink reference signal, the uplink reference signal format including a comb-based pattern of subcarriers within a first orthogonal frequency-division multiplexing (OFDM) symbol having a first comb offset and within a second OFDM symbol having a second comb offset, and the uplink reference signal format configuring a temporal gap, between the first OFDM symbol having the first comb offset and the second OFDM symbol having the second comb offset, that does not include the comb-based pattern;

transmit, to a user terminal in a non-terrestrial network, radio resource control signaling indicating the uplink reference signal format; and receive, from the user terminal in the non-terrestrial network, the coherent transmission of the uplink reference signal on a first plurality of subcarriers within the first OFDM symbol and on a second plurality of subcarriers within the second OFDM symbol.

\* \* \* \* \*